Feb. 10, 1970   M. MUELLER   3,493,998
MACHINE FOR FORMING A FLEXIBLE AREA IN TUBULAR PLASTIC
RESINOUS DRINKING STRAWS
Filed June 2, 1967   19 Sheets-Sheet 3
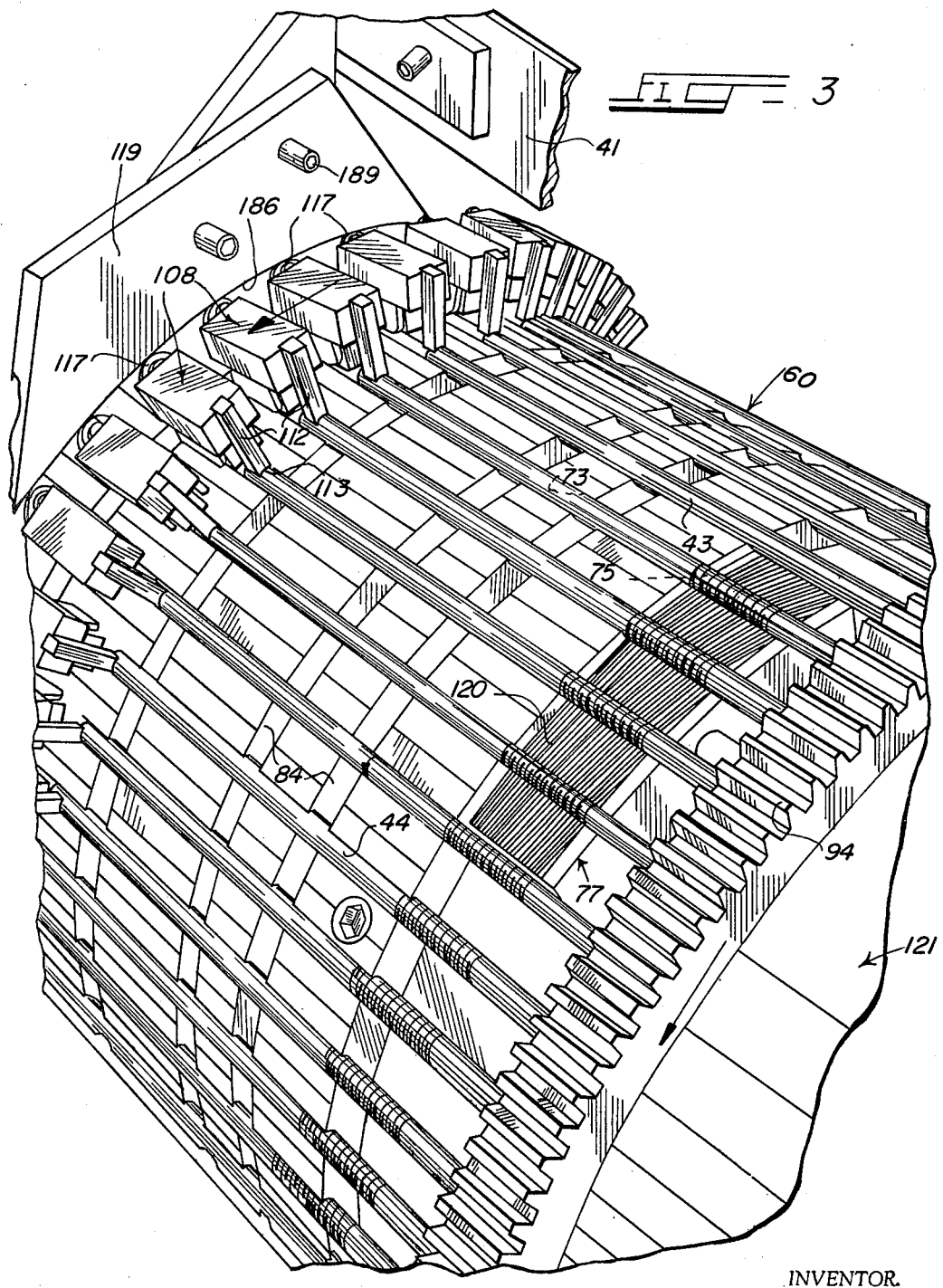
INVENTOR.
MARTIN MUELLER
BY Charles B. Cannon

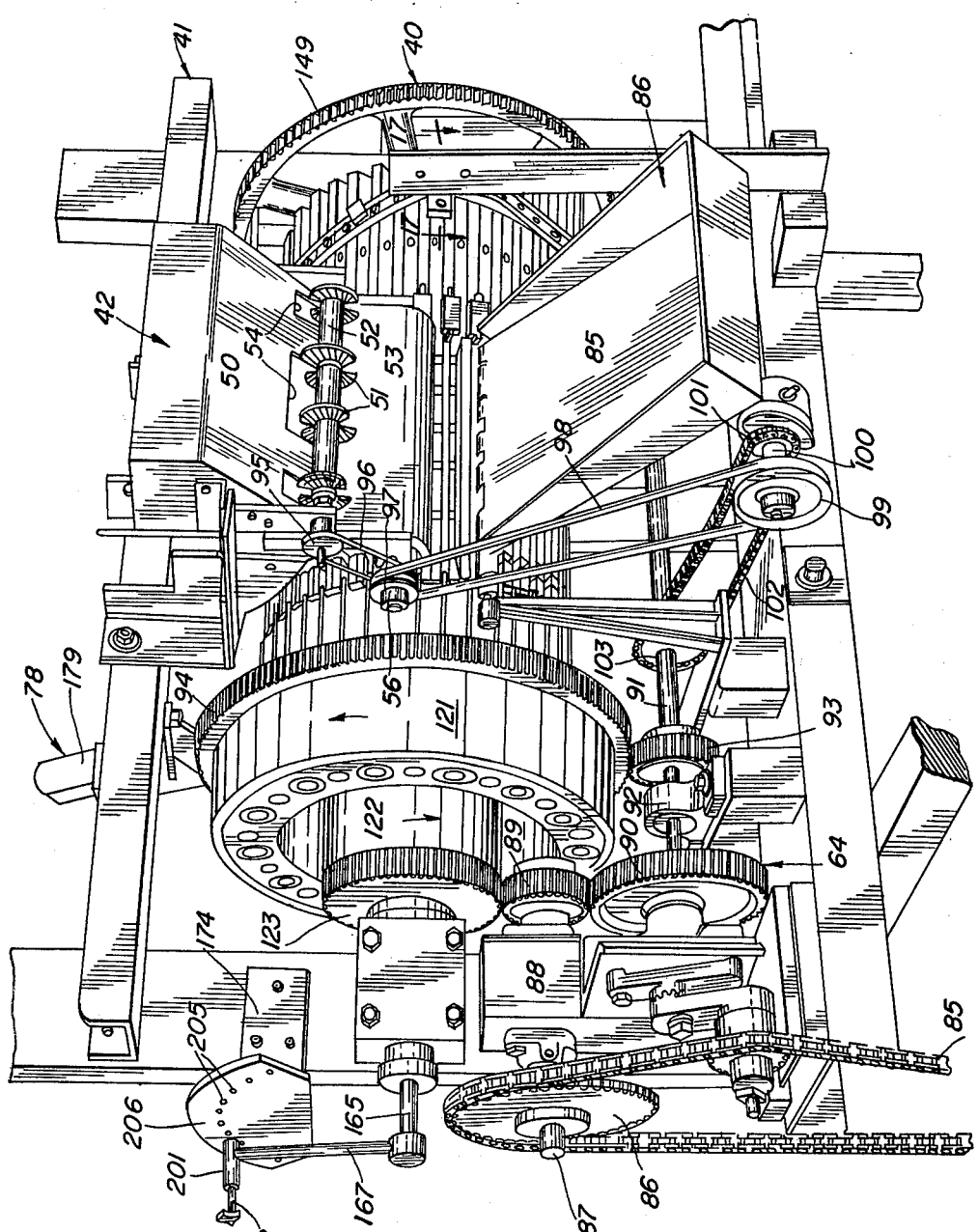

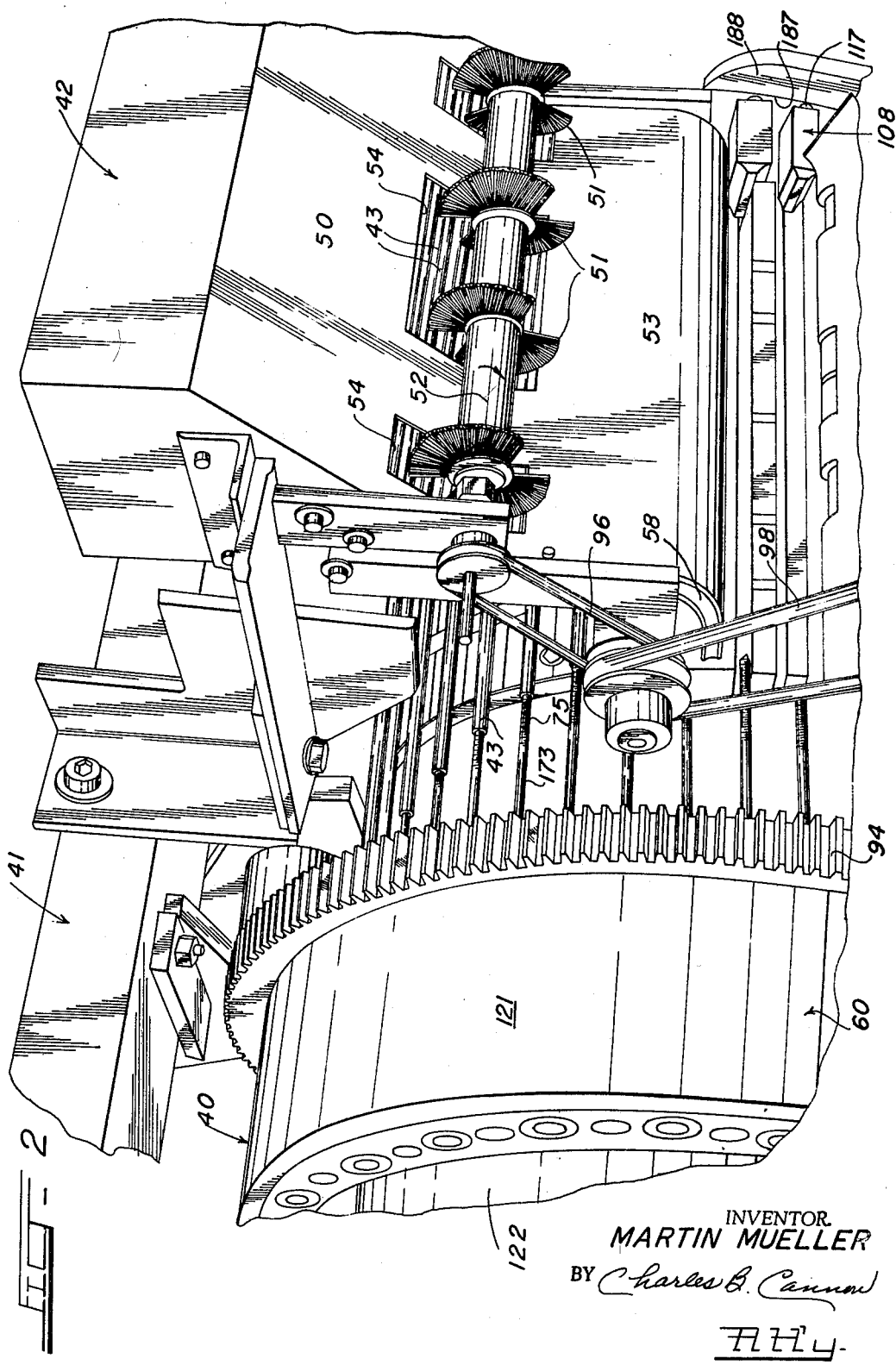

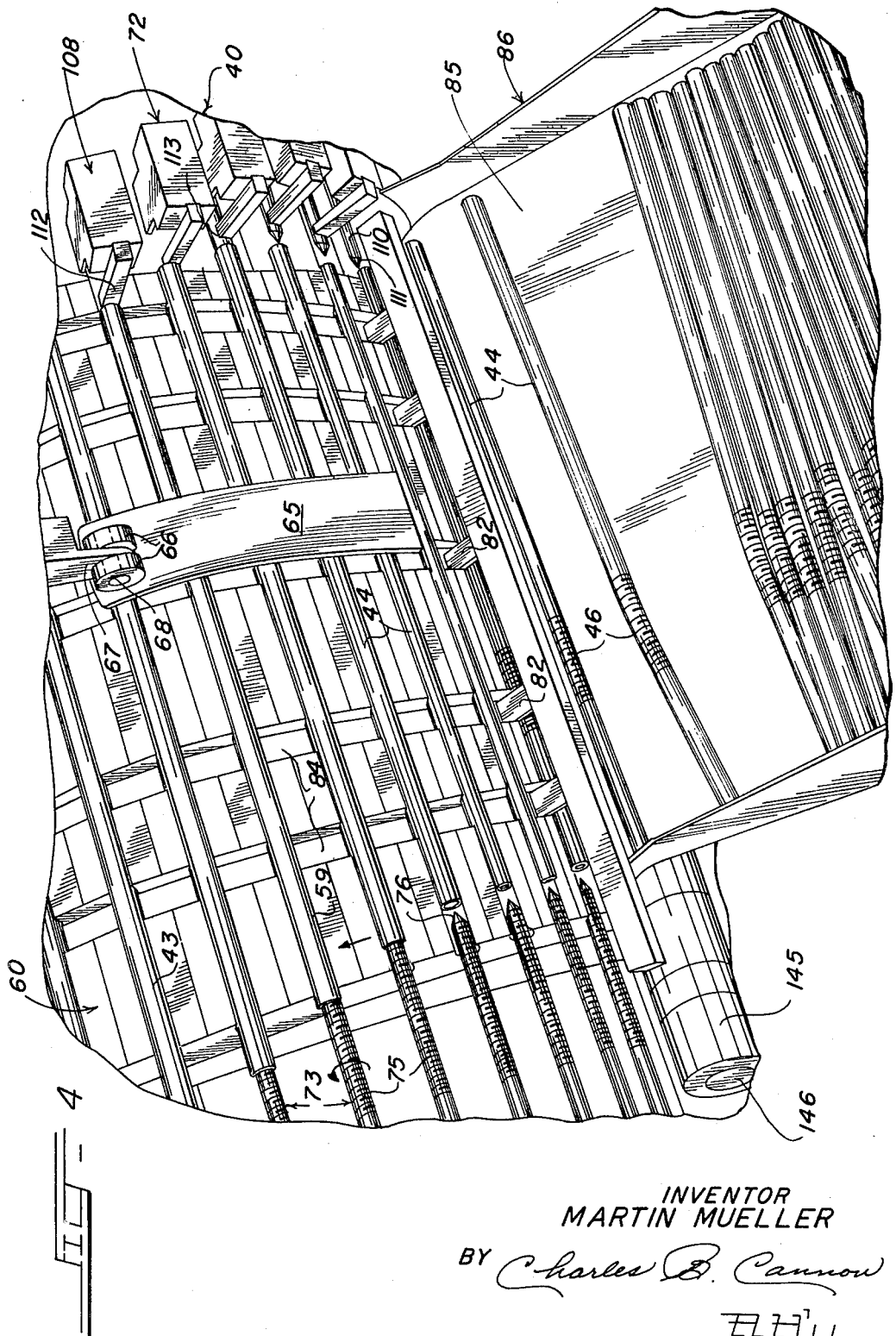

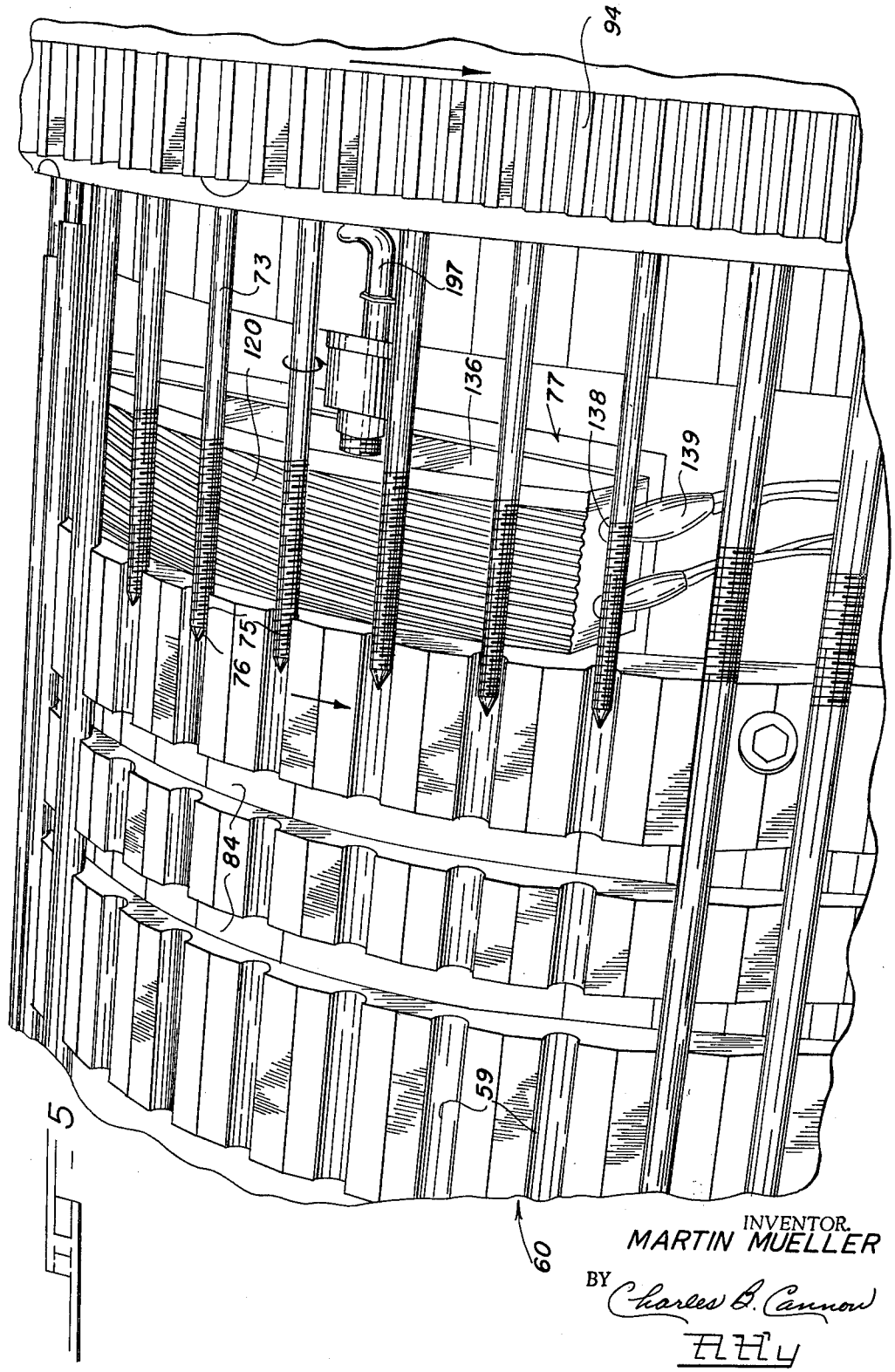

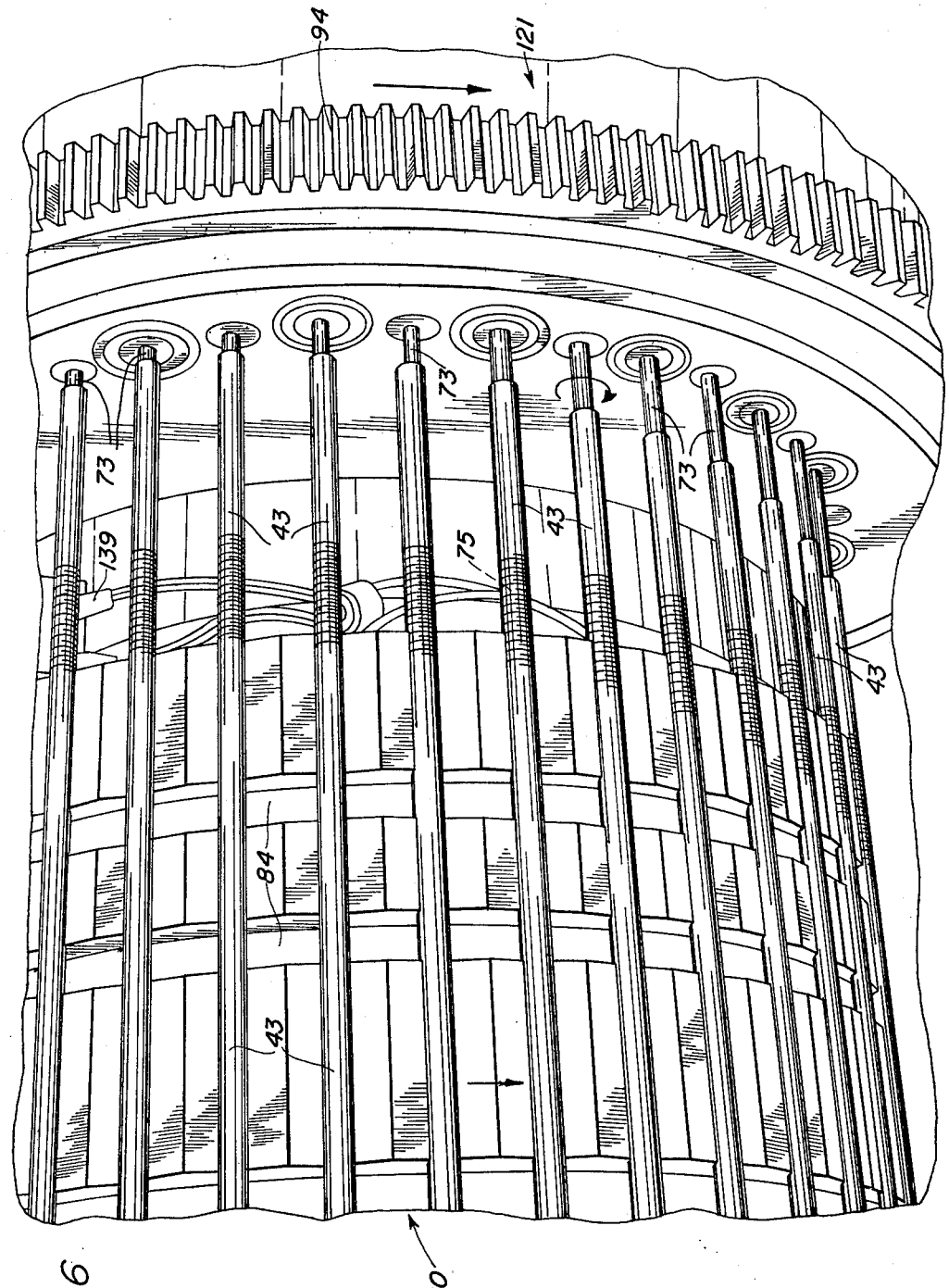

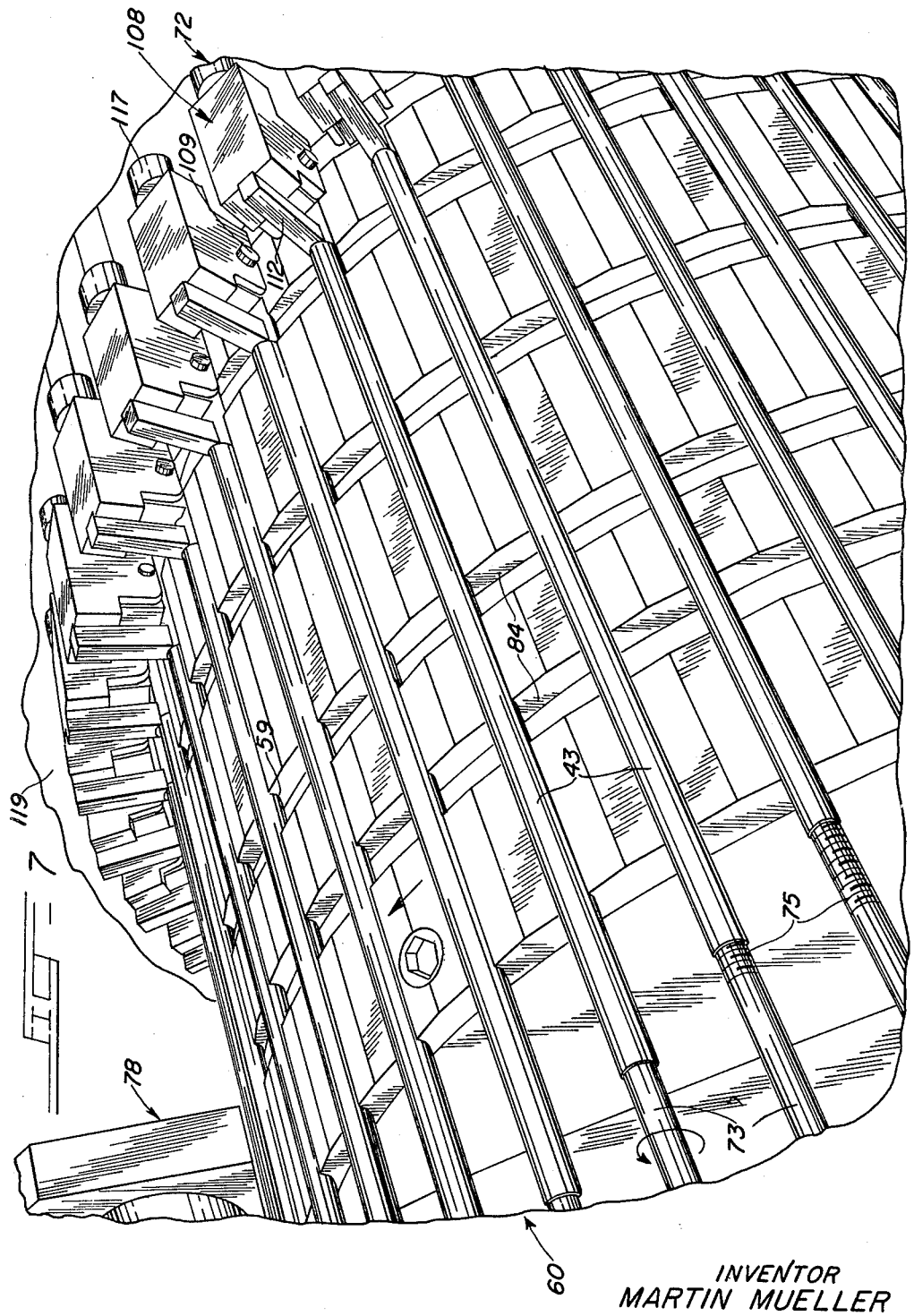

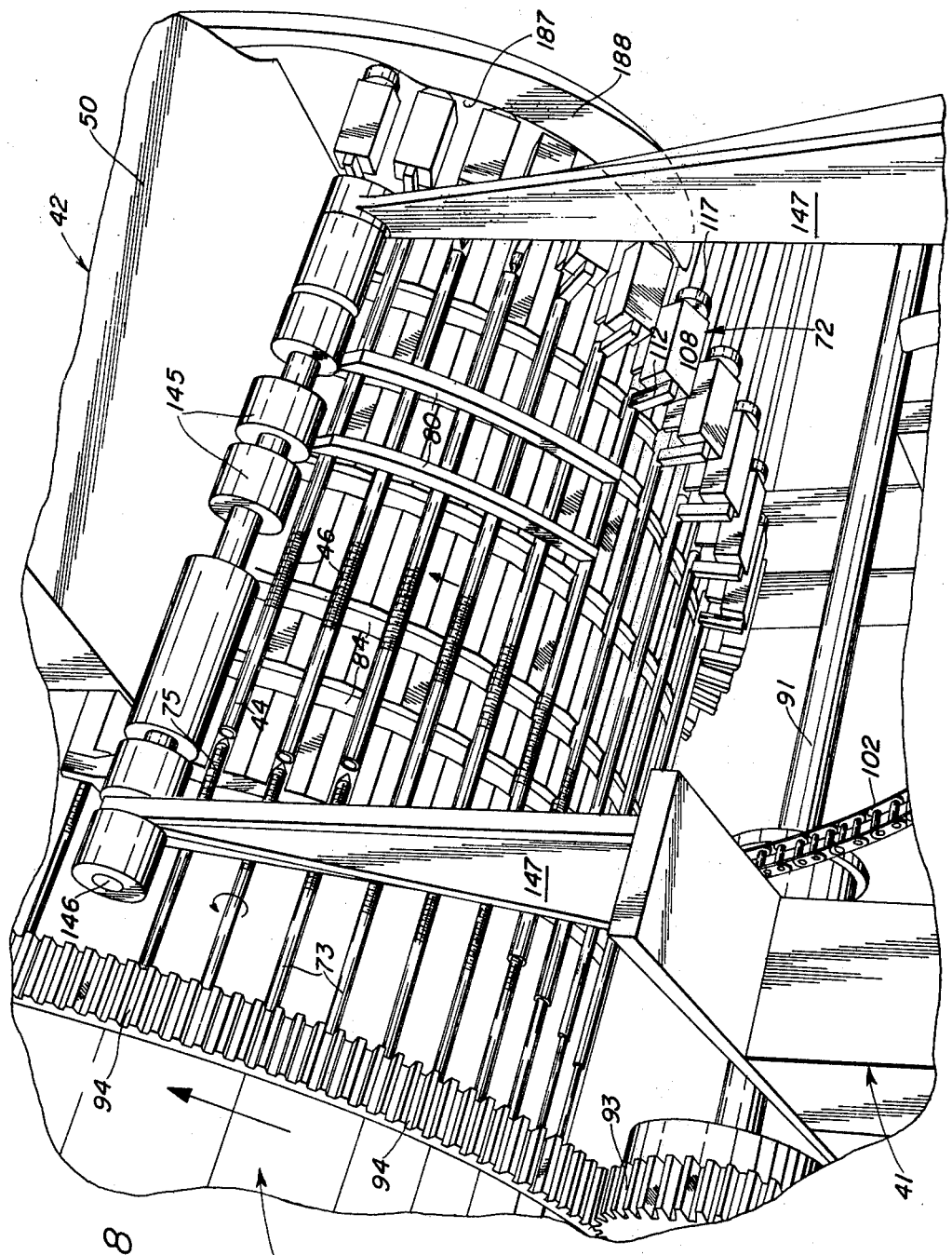

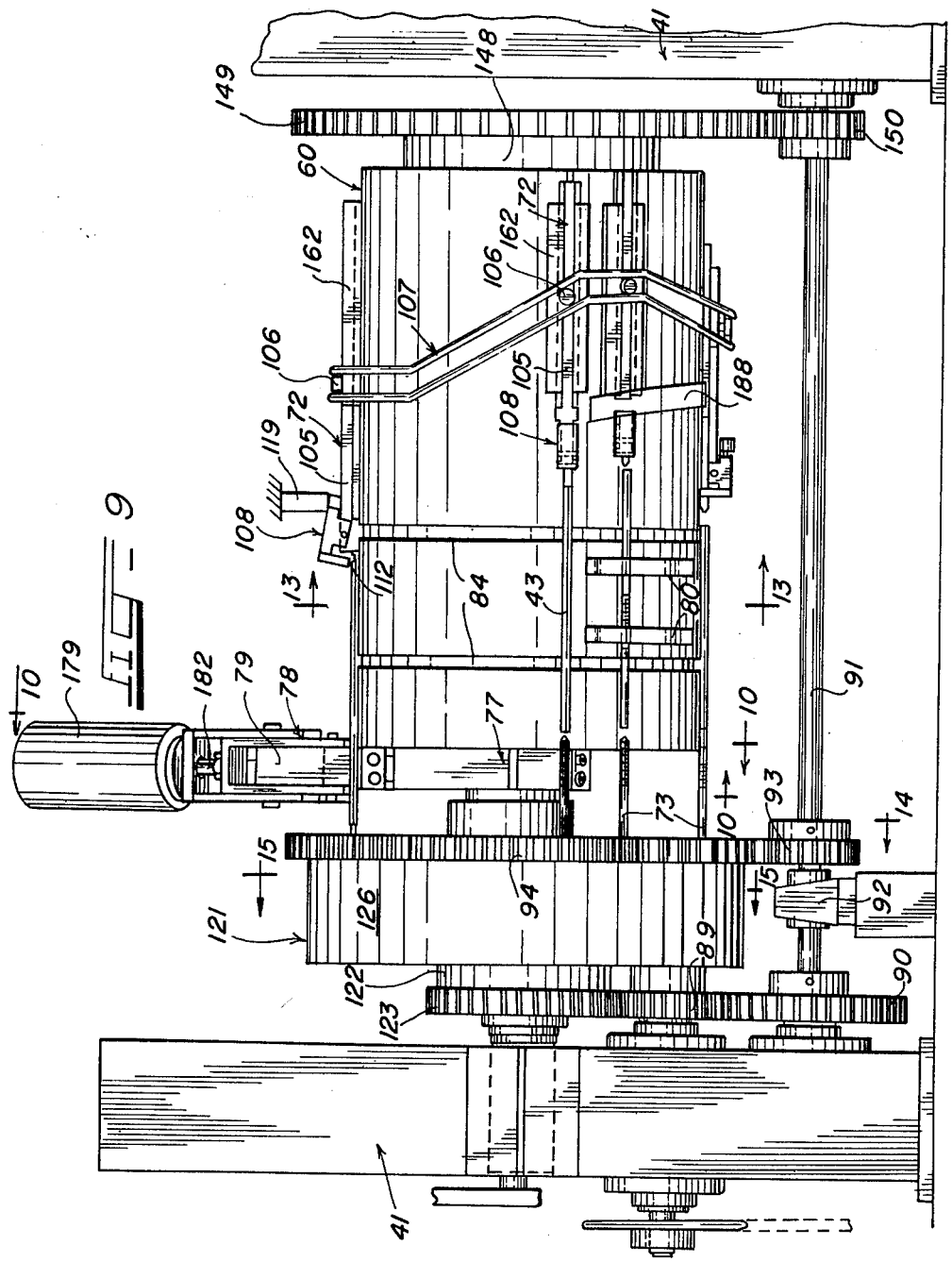

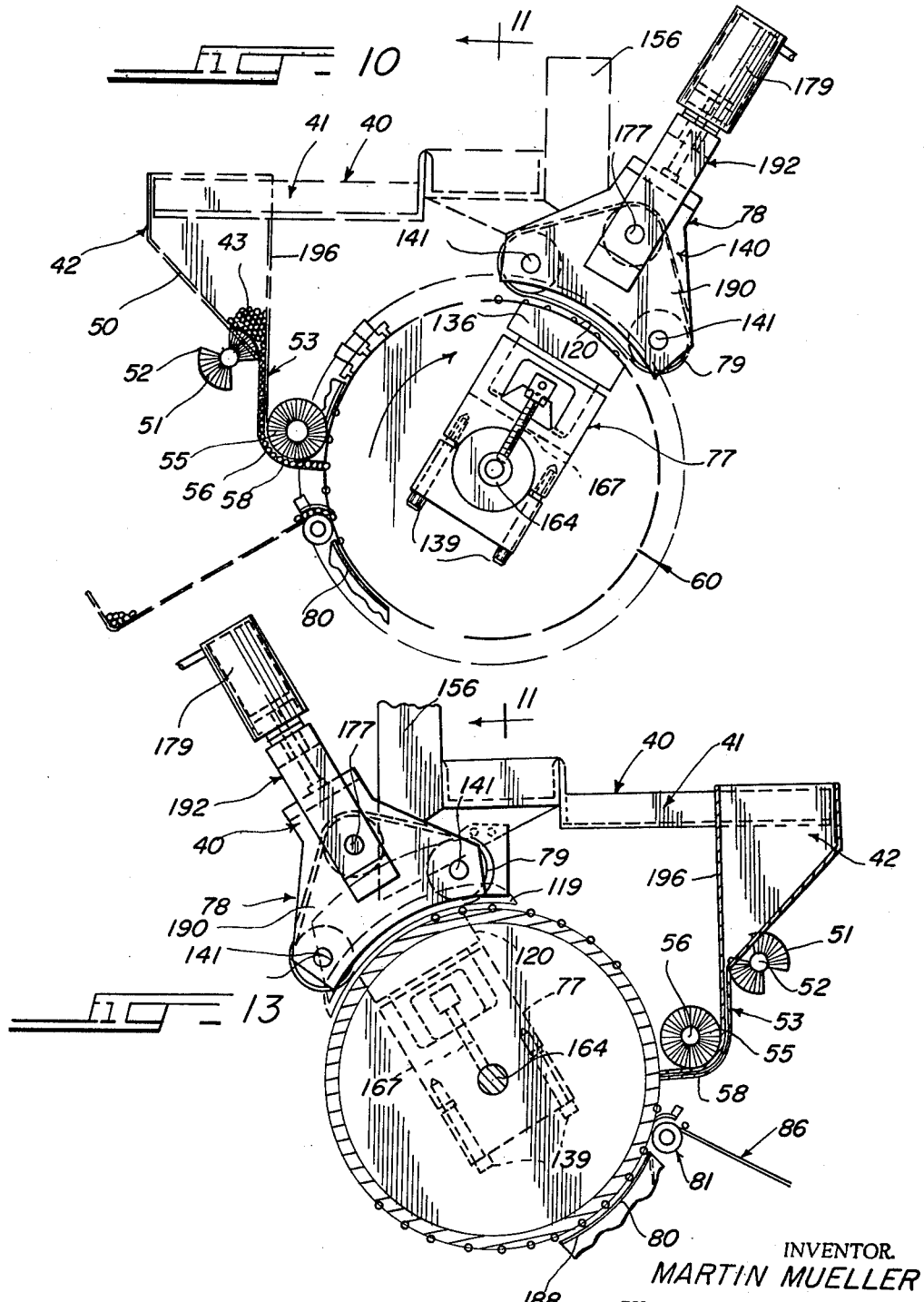

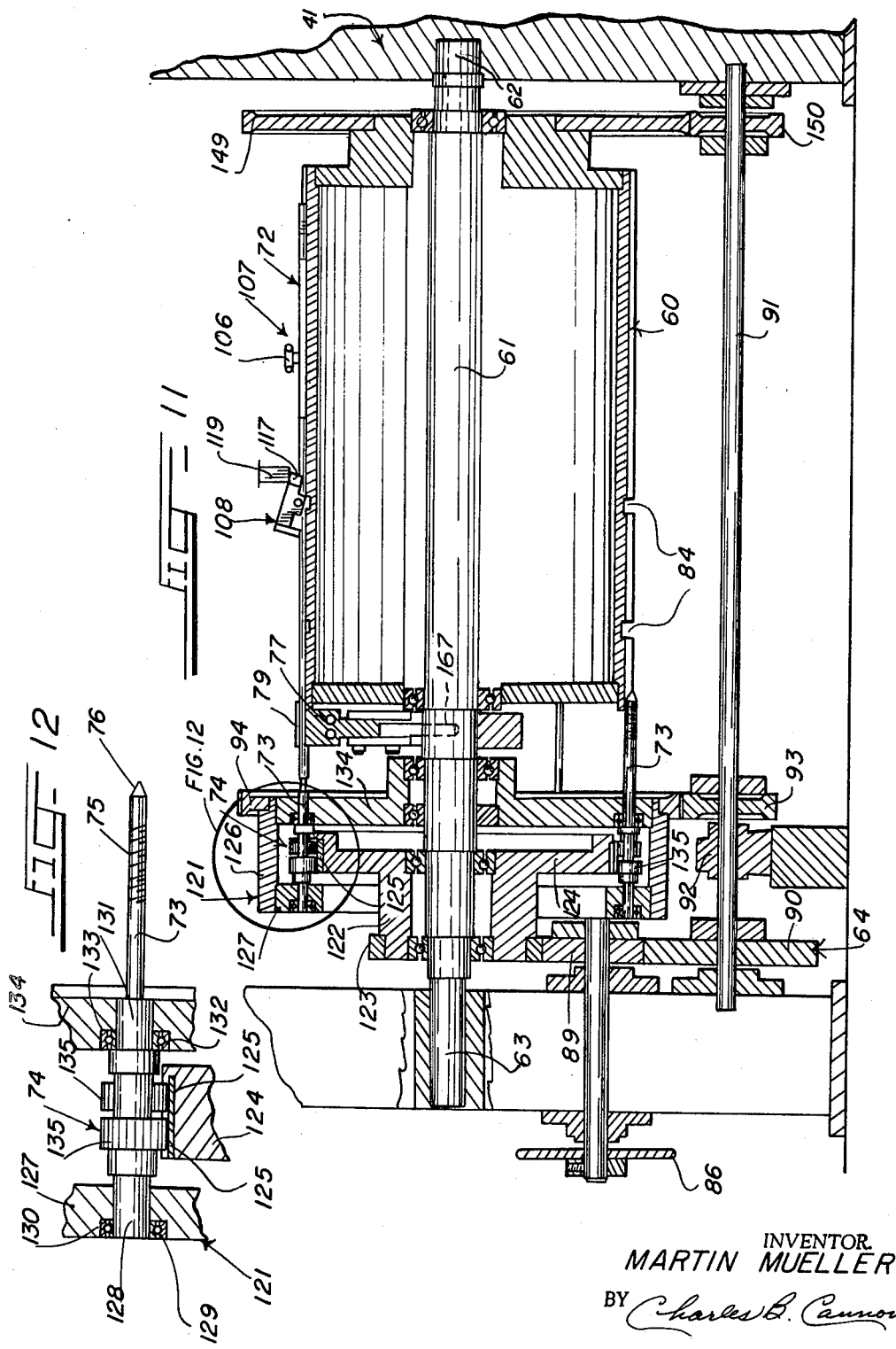

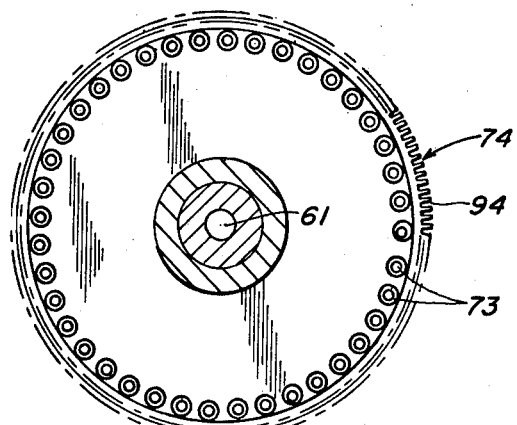
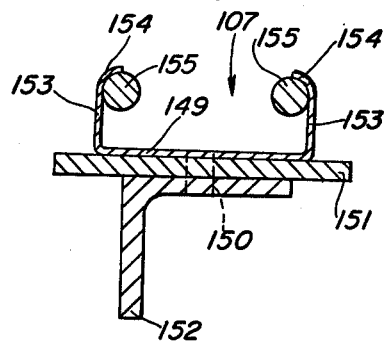
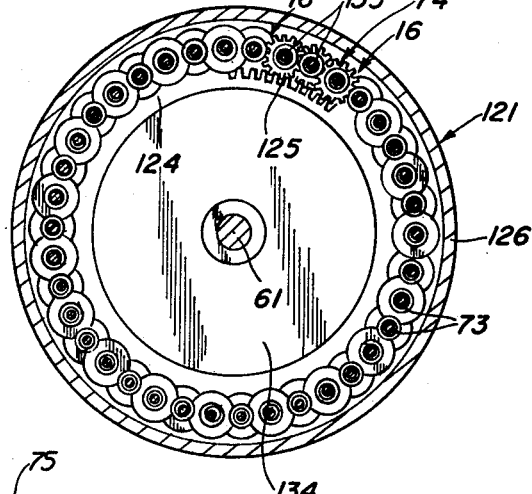
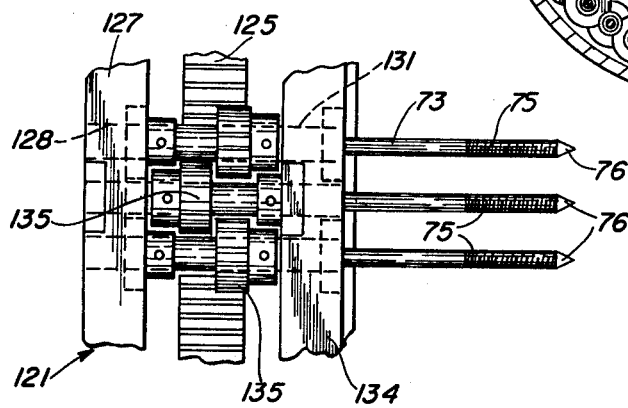

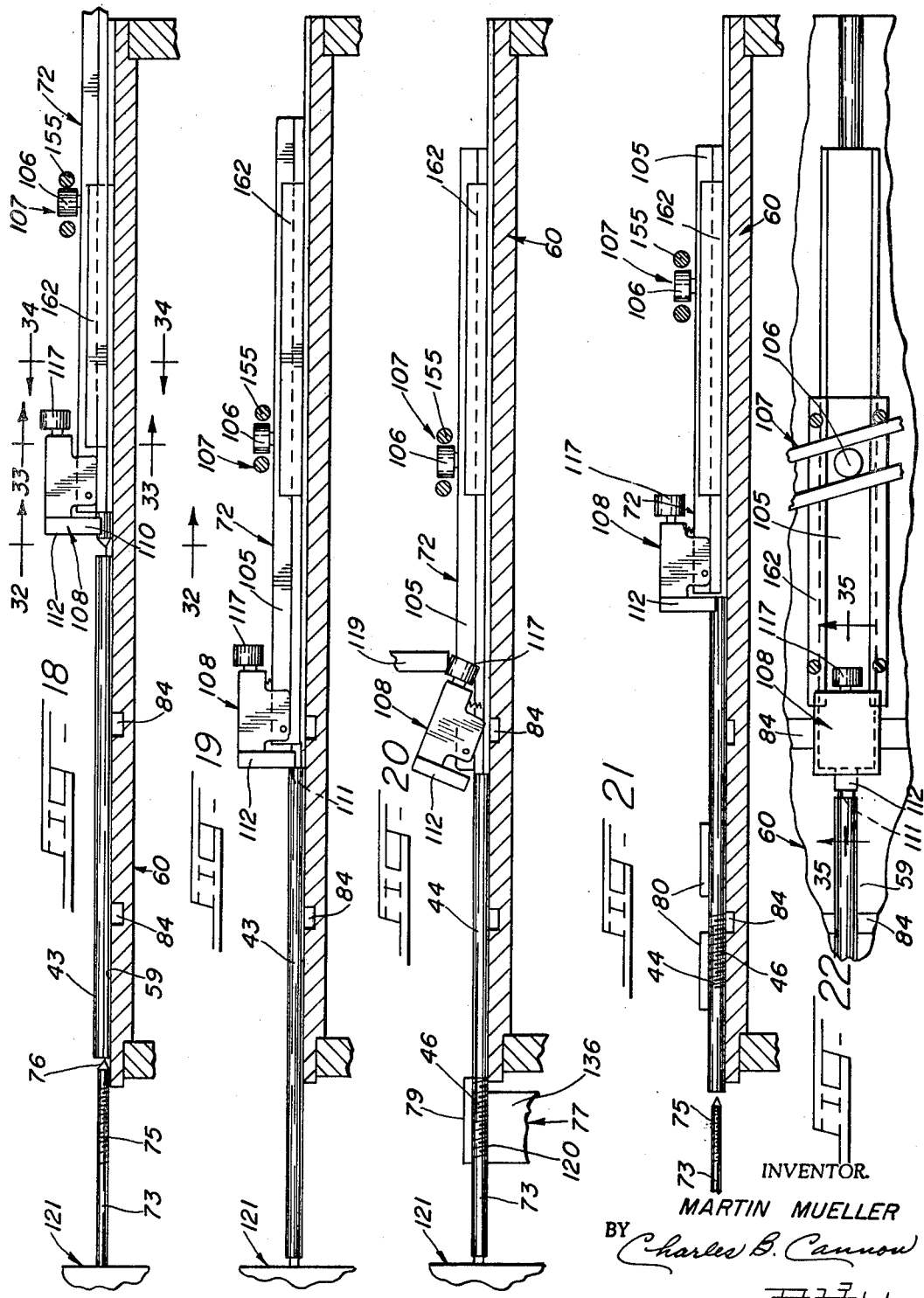

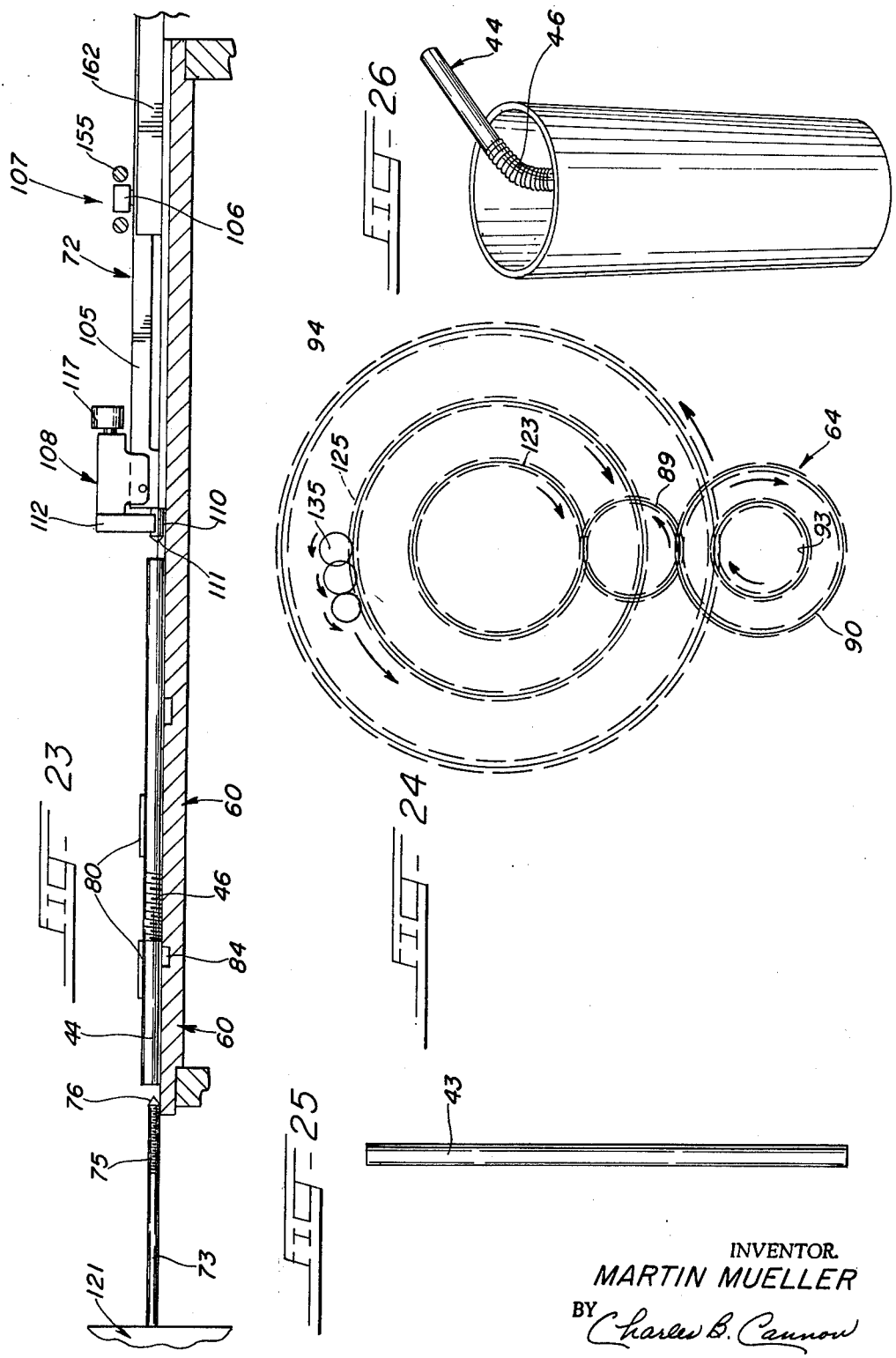

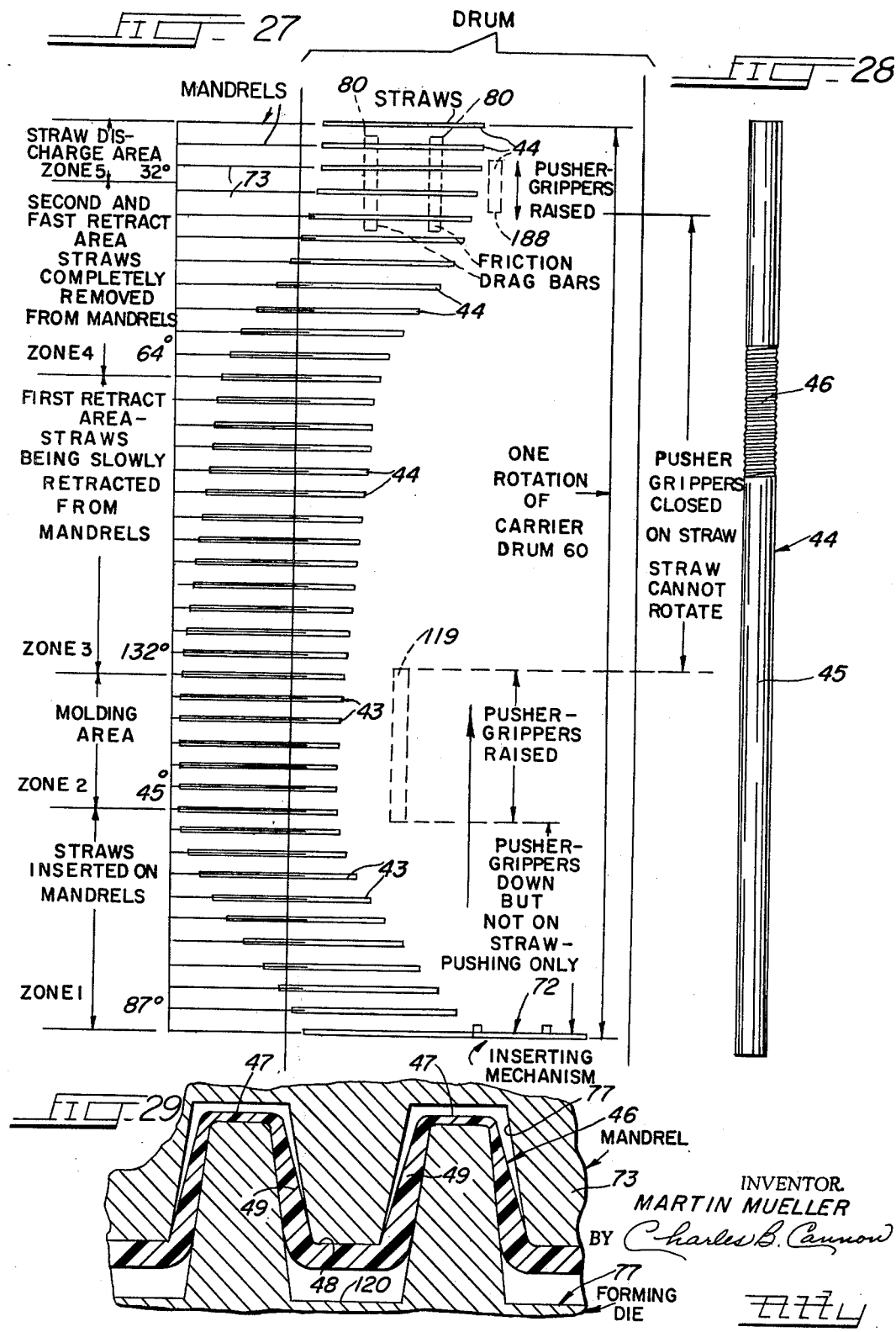

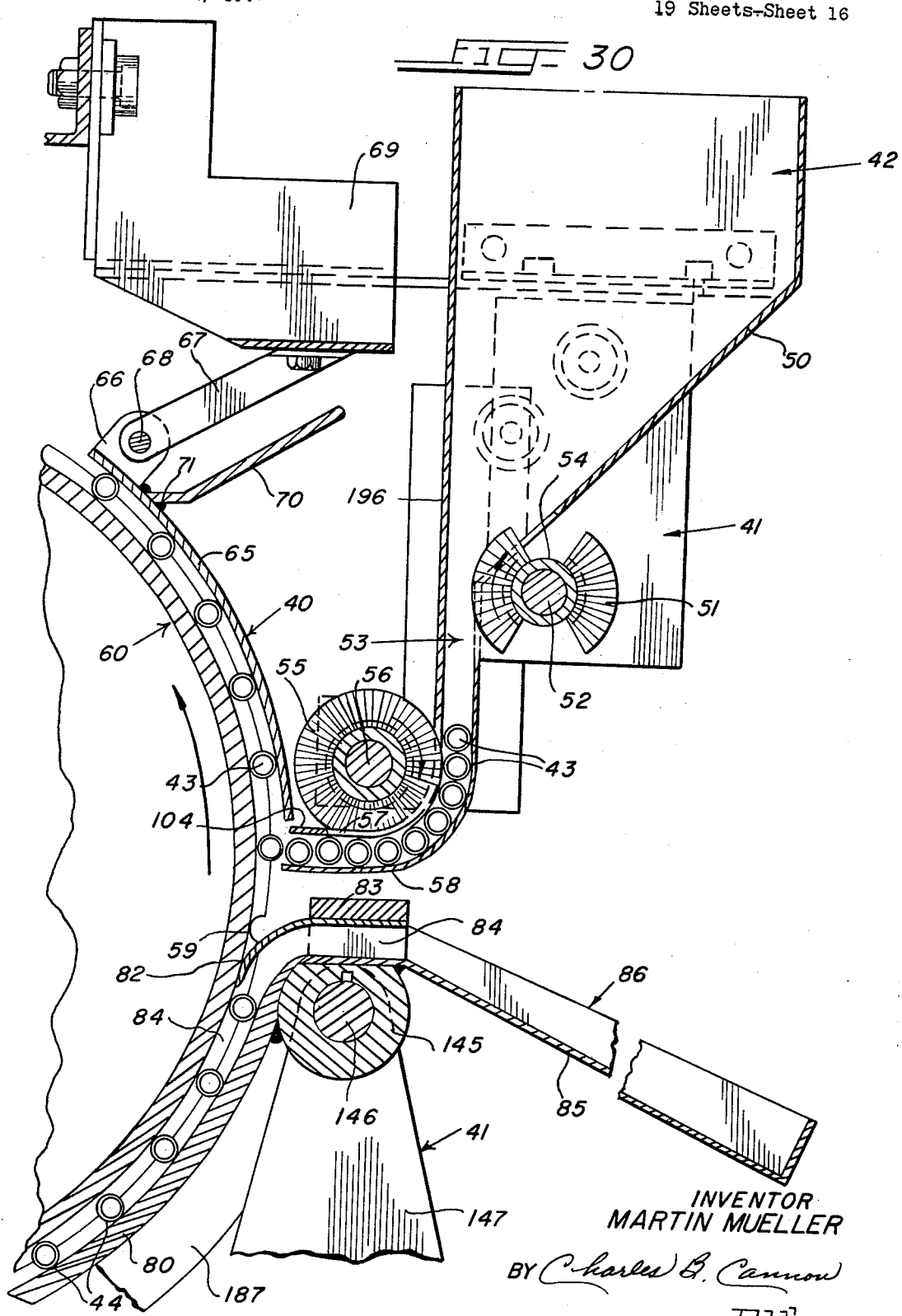

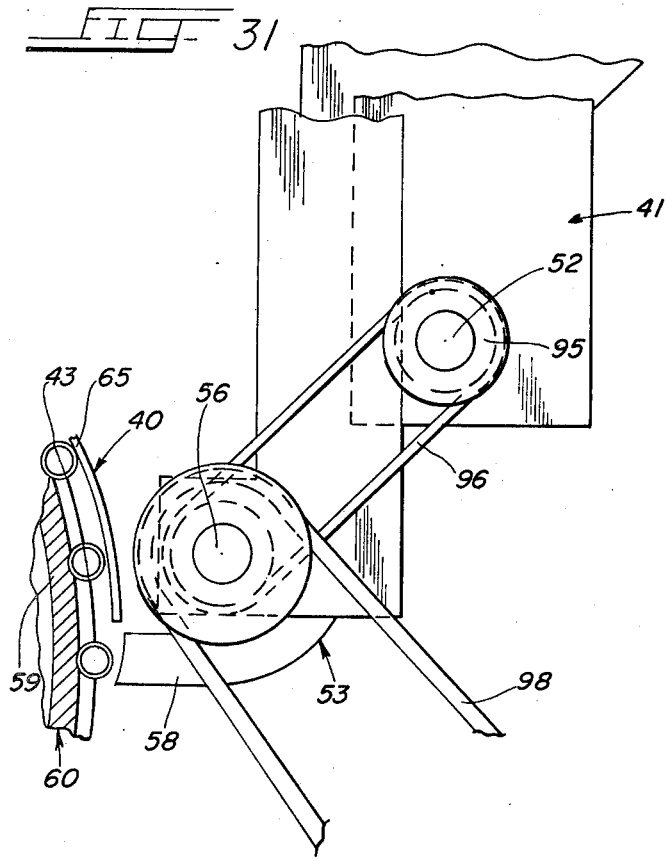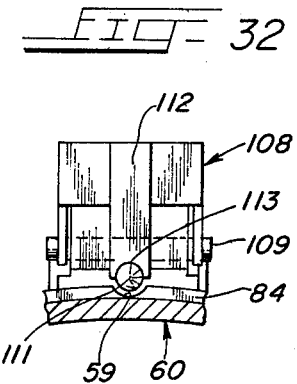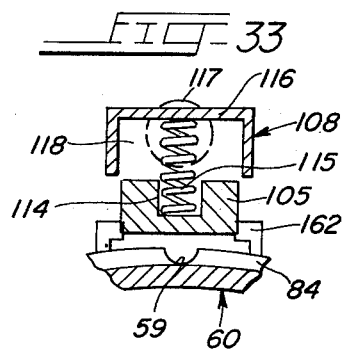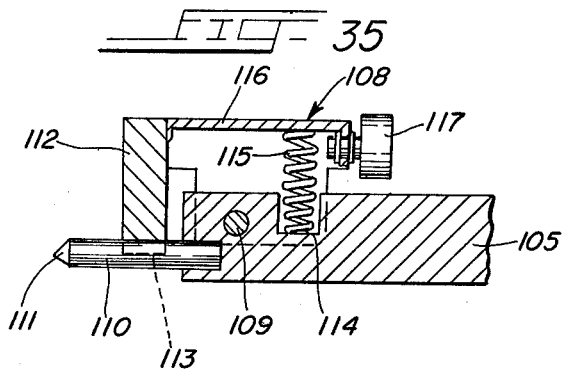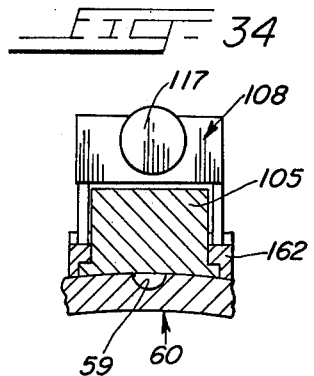
INVENTOR.
MARTIN MUELLER
BY Charles B. Cannon
ATTY

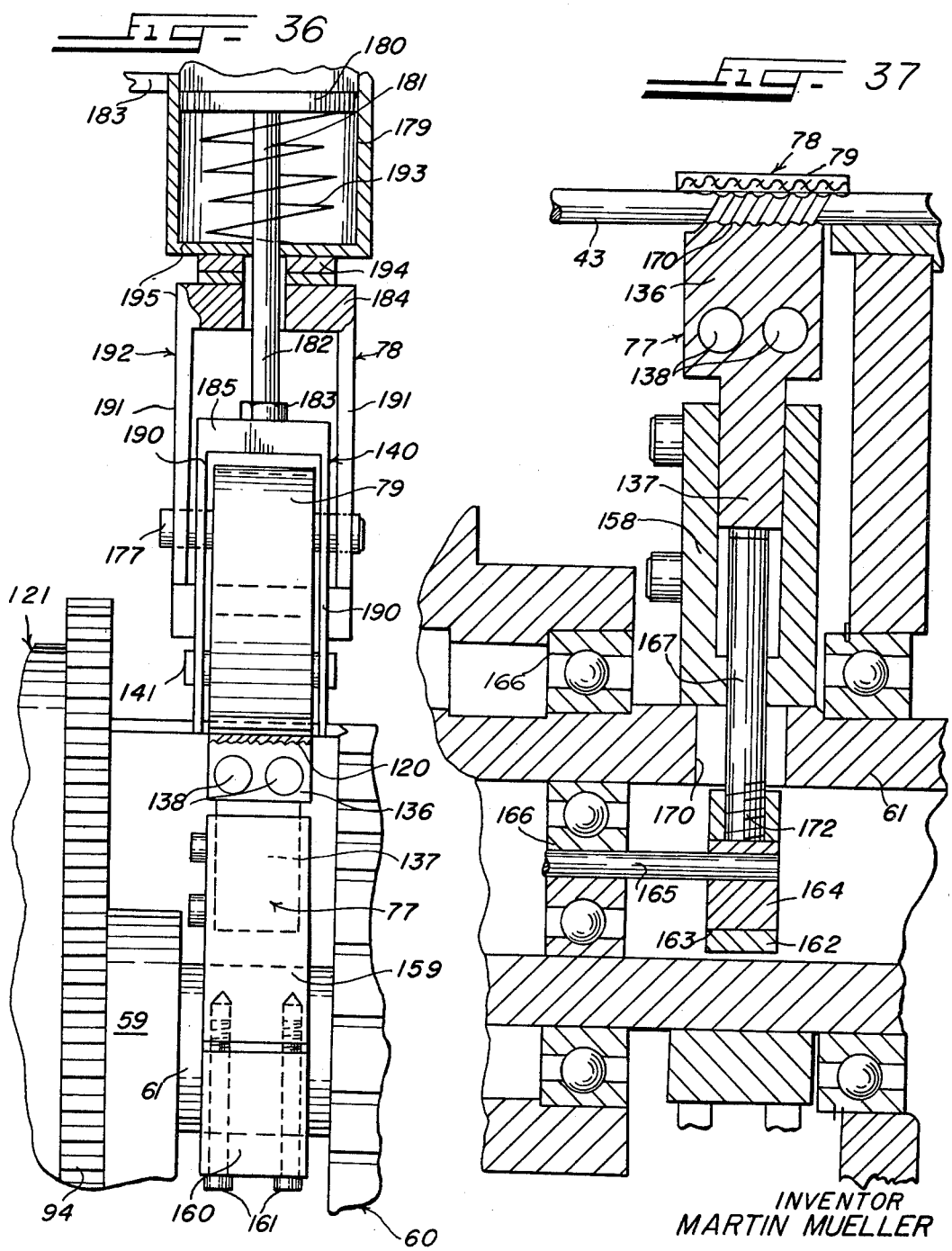

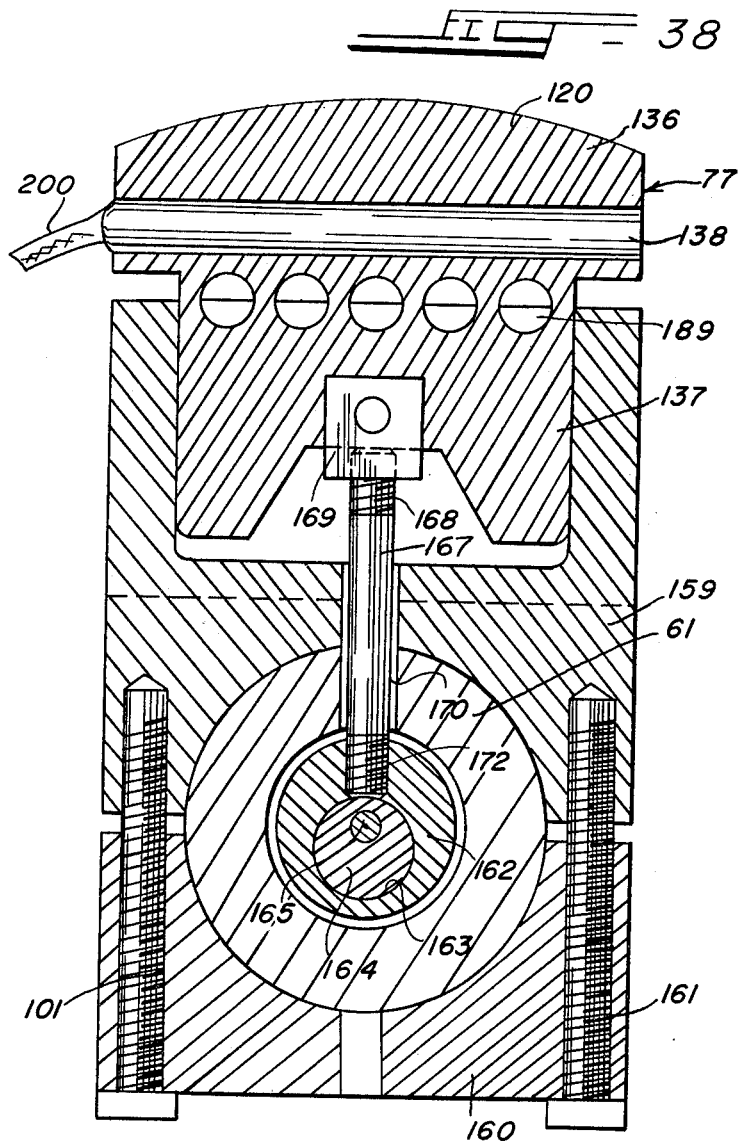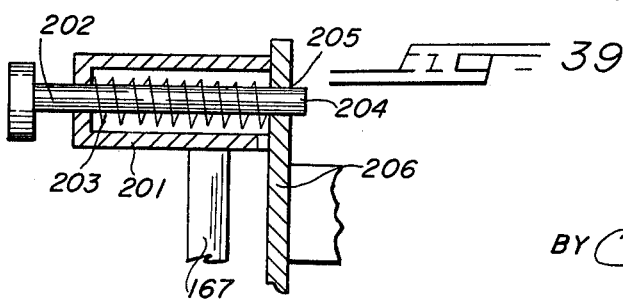

United States Patent Office 3,493,998
Patented Feb. 10, 1970

3,493,998
MACHINE FOR FORMING A FLEXIBLE AREA IN TUBULAR PLASTIC RESINOUS DRINKING STRAWS
Martin Mueller, Chicago, Ill., assignor to Flexible Plastic Straw Corporation, Chicago, Ill., a corporation of Illinois
Filed June 2, 1967, Ser. No. 643,149
Int. Cl. B29c 17/00
U.S. Cl. 18—19                23 Claims

ABSTRACT OF THE DISCLOSURE

Tubular plastic resinous drinking straw members are fed sequentially from a storage hopper into straw-receiving slots or pockets formed in the peripheral surface of a rotating cylindrical carrier drum. As the carrier drum rotates the tubular straw members are pushed by combination straw-pushing and gripping devices carried by the rotatable carrier drum, onto rotating threaded forming mandrels which are carried by and are rotated with a mandrel housing or carrier which rotates with the carrier drum. The tubular straw members are rotated in synchronism by the mandrels in engagement with a heated forming die and a pressure belt device to mold a ribbed area composed of crests and valleys in the bodies of the tubular straw members to provide a flexible area therein which enables the upper portion of the completed drinking straw to be bent at an angle relative to the lower portion thereof during use to facilitate drinking therefrom. After the molding or forming operation, the thus formed tubular drinking straws are withdrawn from the forming mandrels and are ejected from their receiving slots or pockets in the carrier drum into a receiving tray from which they may be withdrawn for use.

OBJECTS

An object of the invention is to provide a new and improved machine for forming or molding a flexible area in tubular plastic drinking straws.

Another object of the invention is to provide a new and improved machine for forming or molding a flexible area composed of alternate crests and valleys in the plastic resinous bodies of tubular drinking straw members and between the ends thereof to enable the upper portion of each thus formed plastic resinous drinking straw member to be bent at an angle relative to the body thereof during use so as to facilitate drinking therefrom.

A further object of the invention is to provide a new and improved machine for forming or molding a flexible area in plastic resinous tubular drinking straws, and which enables the plastic resinous drinking straws to be thus formed or molded in a rapid and economical manner.

An additional object of the invention is to provide in the new plastic resinous drinking straw forming machine a novel rotatable carrier drum for sequentially receiving plastic tubular drinking straw members from a storage hopper and moving them into molding or forming position, and novel means for rotating the tubular plastic resinous drinking straw members in synchronism on their supporting and forming mandrels into and out of engagement with a heated molding die unit for molding a ribbed flexible area therein.

A further object of the invention is to provide novel ejecting means on the rotatable carrier drum for ejecting the formed or molded tubular plastic resinous drinking straw members from the carrier drum and discharging them into a receiving tray or like receptacle.

Still another object of the invention is to provide a novel construction and arrangement of forming mandrels and for supporting and driving the forming mandrels in relation to the carrier drum and the heated die molding unit, and in relation to the parts and devices mounted on and carried by the carrier drum.

A further object of the invention is to provide a novel mandrel housing which is rotated in unison with the rotatable carrier drum and has a plurality of straw-supporting and forming mandrels rotatably mounted therein and spaced at radial intervals therearound, and novel means for rotating the straw-supporting and forming mandrels relative to the mandrel housing and the rotatable carrier drum.

An additional object of the invention is to provide novel means for retracting the formed tubular drinking straw members from their supporting and forming mandrels after the completion of the forming or molding operation.

Still another object of the invention is to provide a novel flexible pressure belt device for urging the tubular plastic resinous drinking straw members on their supporting and forming mandrels into engagement with the heated molding or forming die unit.

A further object of the invention is to provide novel means for sequentially feeding of the tubular plastic resinous drinking straw members from a storage hopper into straw-receiving slots or pockets provided therefor in the rotatable carrier drum.

An additional object of the invention is to provide novel means for adjusting the position of the heated forming die body relative to the forming mandrels so as to vary the depth of the crests and valleys to be formed in the tubular straw members during the forming operation.

Other objects will appear hereinafter.

DESCRIPTION OF FIGURES IN DRAWINGS

FIG. 1 is a front perspective view of the new plastic resinous drinking straw forming machine;

FIG. 2 is an enlarged front perspective view of the feed hopper area and adjacent parts of the machine;

FIG. 3 is an enlarged fragmentary perspective view of the rotatable carrier drum, forming mandrels, and combination straw-pushing and gripping devices embodied in the new plastic resinous drinking straw forming machine;

FIG. 4 is an enlarged fragmentary perspective view showing part of the rotatable carrier drum, forming mandrels, and the receiving trays for the completed drinking straws;

FIG. 5 is an enlarged fragmentary perspective view illustrating parts of the rotatable carrier drum, forming mandrels and the heated forming die unit embodied in the new plastic resinous drinking straw forming machine;

FIG. 6 is an enlarged fragmentary perspective view illustrating the timing sequence in the operation of the forming mandrels, mandrel housing and carrier drum embodied in the new plastic resinous drinking straw forming machine;

FIG. 7 is an enlarged fragmentary perspective view illustrating parts of the rotatable carrier drum, forming mandrels, and the combination straw-pushing and gripping devices which are embodied in the new plastic resinous drinking straw forming machine, and illustrating the manner in which the combination straw-pushing and gripping devices push the tubular plastic drinking straw members onto the forming mandrels;

FIG. 8 is an enlarged fragmentary perspective view illustrating parts of the rotatable carrier drum, forming mandrels, holding rollers and straw retarders for retarding the axial motion of the formed tubular straw members after the completion of the forming operation;

FIG. 9 is a front elevational view of the new plastic resinous drinking straw forming machine with the feeder hopper and the receiving tray removed;

FIG. 10 is a transverse vertical sectional view on line 10—10 in FIG. 9, showing parts of the straw feeding mechanism, the heated forming die unit, and the pressure belt device which is associated with the heated forming die unit;

FIG. 11 is an enlarged longitudinal vertical sectional view on line 11—11 in FIG. 10;

FIG. 12 is an enlarged detail view of the area circled and marked "FIG. 12" in FIG. 11 and showing the mounting of the forming mandrels on the carrier drum;

FIG. 13 is a transverse vertical sectional view on line 13—13 in FIG. 9;

FIG. 14 is a view on line 14—14 in FIG. 9, partly in elevation and partly in section, and illustrating the driving mechanism for the mandrel gear housing;

FIG. 15 is a transverse vertical sectional view on line 15—15 in FIG. 9 illustrating the driving gear mechanism for rotating the forming mandrels;

FIG. 16 is an enlarged plan view on line 16—16 in FIG. 15 showing the mounting for the forming mandrels and the driving gear mechanism for rotating the forming mandrels;

FIG. 17 is a sectional detail view illustrating the circumferentially extending cam trackway which surrounds the rotatable carrier drum for moving the combination straw-pushing and gripping devices axially of the carrier drum;

FIG. 18 is an enlarged detail view, partly in section and partly in elevation, showing one of the combination straw-pushing and gripping devices in the position which it assumes at the initial phase of its operation;

FIG. 19 is a view similar to FIG. 18 but showing the combination straw-pushing and gripping device pushing a tubular drinking straw member onto one of the forming mandrels;

FIG. 20 is a view partly in section and partly in elevation, showing the tubular drinking straw member pushed onto the forming mandrel and showing the straw-pushing and gripping head on the combination straw-pushing and gripping device disengaged from the plastic resinous tubular drinking straw member and showing the tubular straw member during the operation of forming the ribbed flexible area therein as accomplished by the forming mandrel, heated forming die unit and pressure belt device;

FIG. 21 is a view partly in section and partly in elevation showing the means for retarding the axial motion of the tubular straw member after completion of the forming operation and showing the straw-pushing and gripping head engaging the formed tubular straw member to retract it axially of the carrier drum after it has been retracted from the forming mandrel;

FIG. 22 is a top plan view of the combination straw pushing and gripping device and associated parts shown in FIGS. 18 to 21, inclusive;

FIG. 23 is a view partly in section and partly in elevation showing the final position of the combination straw-pushing and gripping device at the completion of its cycle of operation and showing the completely formed drinking straw retracted from the forming mandrel and ready to be discharged from the carrier drum into the receiving tray;

FIG. 24 is a schemmatic view illustrating parts of the driving gear mechanism embodied in the new drinking straw forming machine;

FIG. 25 is an elevational view of a tubular drinking straw member such as may be employed in making the new formed flexible drinking straws of the present invention;

FIG. 26 is an elevational view illustrating the use of one of the new flexible drinking straws formed by the machine of the present invention;

FIG. 27 is a schematic diagram illustrating the timing sequence in the operation of the forming mandrels and associated parts of the new plastic resinous drinking straw forming machine during one complete revolution of the rotatable carrier drum;

FIG. 28 is an elevational view of a complete drinking straw formed by the new plastic resinous drinking straw forming machine;

FIG. 29 is an enlarged sectional view showing the heated straw forming die unit and one of the forming mandrels during the operation of forming the ribbed flexible area in the new flexible drinking straws;

FIG. 30 is an enlarged fragmentary sectional detail view of part of the rotatable carrier drum and of the feeder hopper and of the straw feeding means associated therewith for feeding the flexible plastic resinous tubular drinking straw members one at a time from the feeder or storage hopper onto the rotatable carrier drum; and showing parts of the holding device for holding the tubular straw members on the carrier drum at the start of the operation; and also showing the receiving tray or receptacle for the completed and formed drinking straw members and the means for discharging the completed and formed drinking straw members from the rotatable carrier drum into the receiving tray or receptacle;

FIG. 31 is a fragmentary view, partly in section and partly in elevation, of the feeding means for feeding the plastic resinous tubular drinking straw members one at a time from the feeder or storage hopper onto the rotatable carrier drum;

FIG. 32 is a view partly in section and partly in elevation, on line 32—32 in FIG. 18, illustrating the construction of the straw-pushing and gripping head in one of the new combination straw pushing and gripping devices on the rotatable carrier drum for moving the tubular plastic resinous drinking straw members axially in their slots or pockets on the carrier drum into engagement with the forming mandrels;

FIG. 33 is a vertical sectional view on line 33—33 in FIG. 18 and also showing parts of the combination straw-pushing and gripping head and the guideway therefore and associated parts;

FIG. 34 is a view on line 34—34 in FIG. 18, partly in section and partly in elevation, further illustrating the combination straw-pushing and gripping head embodied in one of the combination straw-pushing and gripping devices;

FIG. 35 is a sectional view on line 35—35 in FIG. 22 illustrating parts of one of the combination straw-pushing and the straw-gripping devices;

FIG. 36 is an elevational view illustrating the heated forming die unit and the pressure belt device associated therewith;

FIG. 37 is an enlarged sectional view of the heated forming die unit shown in FIG. 36 and also illustrating part of the pressure belt device;

FIG. 38 is an enlarged sectional view of the heated forming die unit and the adjusting means therefor; and FIG. 39 is a sectional detail view of the means for adjusting the position of the heated forming die body relative to the forming mandrels.

GENERAL CONSTRUCTION AND OPERATION

Feeder hopper, carrier drum and straw-feeding brushes

A typical and preferred embodiment of the new straw forming machine is illustrated in FIGS. 1 to 39, inclusive, of the drawings, wherein it is generally indicated at 40, and comprises a supporting frame generally indicated at 41, and on the upper portions of which a feed or storage hopper 42 is mounted. The feed or storage hopper 42 is adapted to hold a stack or supply of tubular plastic resinous drinking straw members 43 (FIG. 25) which are formed by the new straw-forming machine into completed flexible drinking straws 44 each of which includes a relatively stiff or rigid tubular body 45 having formed therein a ribbed flexible area 46 which is defined by alternate ridges 47 and intervening valleys 48 which are interconnected by interconnecting web portions 49 (FIGS. 26, 28 and 29). The new machine 40 is designed to form the flexible area 46 in the tubular straw member 43 and embodies means and devices for so doing which will be described in detail hereinafter. Such a completed tubular plastic drinking straw member 44 formed the subject matter of applicant's co-pending application, Ser. No. 537,985, filed Mar. 28, 1966 and entitled "Flexible Drinking Straws."

As shown in FIGS. 10, 13 and 30, the tubular plastic resinous drinking straw members 43 are fed by gravity from the body of the feeder or storage hopper 42 down the inclined bottom wall 50 there of into contact with a series of horizontally spaced rotatable straw-propelling upper brushes 51 which are mounted on a horizontal shaft 52 which is rotatably mounted in the supporting frame 41 adjacent a restricted discharge outlet or throat 53 which is arranged at the bottom of the feeder or storage hopper 42.

As shown in FIGS. 10, 13 and 30 each of the segments of the upper straw-propelling brushes 51 is adapted to project into one of a series of spaced slots 54 which are formed in the inclined bottom wall 50 of the storage hopper 42 so as to engage the tubular straw members 43 therein and propel them upwardly, thereby allowing only a single straw member 43 to be discharged at a time into the restricted discharge throat or outlet 53. As shown in FIG. 30, the brushes 51 are spaced from the adjacent vertical wall 196 of the hopper 42 approximately the thickness of one straw member 43, and this arrangement is such as to prevent more than one straw member 43 from passing into the restricted discharge outlet or throat 53 at one time.

As the tubular drinking members 43 pass down the restricted discharged outlet or throat 53 of the feeder or storage hopper 42 they are engaged by another and lower group of horizontally spaced straw-propelling brushes 55 which are mounted on a horizontal shaft 56 which is rotatably mounted in the supporting frame 41 below the upper straw-propelling brushes 51 (FIG. 30). Each of the lower straw-propelling brushes 55 is adapted to project into a slot 57 formed in the restricted discharge throat or outlet 53 of the storage or feeder hopper 42, and as they are rotated the lower straw-propelling brushes 55 propel the tubular drinking straw members 43 into and along a horizontally extending lower end portion 58 of the discharge outlet or throat 53 of the feeder or storage hopper 42 from which the tubular straw members 43 are ejected or fed, one at a time, by the lower straw-propelling brushes 55 into straw-receiving slots or pockets 59 which are formed in, and which are spaced at intervals radially around the peripheral surface of a rotatable carrier drum or cylinder which is generally indicated at 60. The rotatable carrier drum 60 is rotatably mounted upon a horizontally extending stationary or non-rotatable supporting shaft 61 which has end portions 62 and 63 which are rigidly mounted in the supporting frame 41 (FIG. 11); the carrier drum or cylinder 60 being rotated by a drive mechanism 64 (FIG. 1) which will be described hereinafter.

The means for retaining the tubular straw members in their slots of pockets in the carrier drum As the tubular straw members 43 are discharged from the inwardly angled portion of the restricted throat or outlet 53 of the storage or feeder hopper 42 into the straw-receiving slots or pockets 59 in the outer peripheral surface of the carrier drum 60 they are held in the slots or pockets 59 during the first part of the rotational cycle of the carrier drum 60, by an arcuate-shaped straw-retaining bar member 65 (FIGS. 4 and 30). The upper end portion of this straw-retaining bar 65 has pairs of spaced ears or brackets 66 thereon to which a lever arm 67 is pivotally connected, as at 68 (FIGS. 4 and 30). The lever arm 67 is fastened at its upper end to a part 69 of the supporting frame 41, and a weight arm member 70 is attached, as at 71, to the outer surface of the straw-retaining bar member 65 which is thus urged, by action of the weight arm member 70, into engagement with the tubular straw members 43 so as to hold them in their pockets or slots 59 in the carrier drum 60 during the first part of the rotational cycle of the carrier drum 60.

Forming mandrels and straw-pushing and gripping devices

As the carrier drum or cylinder 60 is rotated on its stationary supporting shaft 61, it carries with it the plastic resinous tubular straw members 43 which are disposed in the straw-receiving slots or pockets 59 in the outer peripheral surface of the carrier drum or cylinder 60, and at a certain stage in the cycle of rotation of the carrier drum or cylinder 60, each of the tubular drinking straw members 43 is acted upon one of a series of combination straw-pushing and gripping devices, which are generally indicated at 72, and which are mounted at spaced radial intervals circumferentially around and on the outer peripheral surface of the carrier drum or cylinder 60 (FIGS. 3, 4, 7, 8, 9, 11, 18, 19, 20, 21, 22, 32, 33, 34, and 35). Each of these combination straw-pushing and gripping devices 72 includes a head 108 which sequentially engages and pushes one of the tubular drinking straw members 43 axially or longitudinally in its straw-receiving slot or pocket 59 in the outer peripheral surface of the carrier drum or cylinder 60 onto one of a plurality or bank of rotating forming mandrels 73 which are mounted on and are carried by the rotatable carrier drum or cylinder 60 and are arranged at radially spaced intervals around the outer peripheral surface of the carrier drum or cylinder 60. The forming mandrels 73 are mounted for independent but synchronous rotation on and relative to the carrier drum or cylinder 60 and are driven by a mandrel gear drive mechanism, which is generally indicated at 74, and which will be described hereinafter (FIGS. 11, 12, 14, 15 and 24). Each of the forming mandrels 73 has has an externally threaded end portion 75 which terminates in a cone-shaped front end or nose portion 76 (FIGS. 5, 16, 18 and 21).

Heated forming die unit

As the forming mandrels 73 are rotated on and relative to the carrier drum or cylinder 60 the tubular drinking straw members 43 are pushed axially or longitudinally in their slots or pockets 59 on the carrier drum 60 onto the forming mandrels 73 by the heads 108 of the combination straw-pushing and gripping devices 72 and that portion of each tubular straw member 43 in which the ribbed flexible area 46 is to be formed is pushed, while on one of the mandrels 73, into engagement with a heated forming die unit, which is generally indicated at 77, and which is mounted adjacent one end of the carrier drum or cylinder 60 (FIGS. 36, 37 and 38).

The heated forming die unit 77 is adjustably mounted on the stationary shaft 61 within the body of the carrier drum 60 and includes a heat-conductive metallic die body 136 on which the die forming surface 120 is provided (FIGS. 36, 37 and 38). Electrical resistance heating elements 138 are mounted in the die body 136 and are controlled by a thermocouple unit 197 and are connected to suitable conductors 139 (FIG. 5). The thermocouple unit 197 controls the electrical resistance heating elements 138 from a temperature control unit (not shown).

The body 136 of the heated forming die unit 77 has a depending extension 137 which is slidably guided in a guideway holder 158 which has a clamping portion 159 which cooperates with a complementary clamping member 160 and bolts 161 to clamp the guideway holder 158 and the heated forming die unit 77 on the stationary supporting shaft 61. A rod 167 has a threaded upper end portion 168 which is threaded into a block 169 which is attached to the depending extension 137 of the body 136 of the heated forming die unit 77. This rod 167 projects through and is slidably mounted in an opening 170 in the stationary supporting shaft 61 and the rod 167 has a threaded inner end portion 172 which is threadedly connected to an eccentric cam follower member 162 which is loosely mounted in the supporting shaft 61. This eccentric cam follower member 162 has a bearing opening 163 formed therein and an eccentric cam member 164 is rotatably mounted in the bearing opening 163. This eccentric cam member 164 is mounted on and is rotatable with a manually operable shaft 165 which is rotatably mounted in suitable bearing races as 166, within the supporting shaft 61 (FIGS. 37 and 38). The shaft 165 projects externally of the stationary supporting shaft 61 at one end of the machine (FIG. 1) and it has an upwardly extending handle arm 167 thereon which carries a tubular spring housing 201. A headed manually operable latch pin 169 is slidably mounted in the spring housing 168 and this latching pin 202 has an inner latching end portion 204 which is selectively latchingly engageable in any one of an arcuate row of latch openings 205 which are formed in a stationary latch plate 206 which is attached, as at 174, to the supporting frame 41 (FIG. 1). The latch pin member 202–204 is normally urged by a coil spring 203 in the housing 201, in a direction to project its latching inner end portion 204 thereof into latching engagement with a selected one of the latch openings 205 in the stationary latch plate 206 (FIG. 39).

The construction and mounting of the heated forming die unit 77 are such that the heated forming die body 136 may be adjusted, to a limited extent, as for example, 1/16″ relative to the forming mandrels 73 so as to control and vary the depth of the crests 47 and valleys 48 formed in the flexible areas 46 of the straw members 43 during the forming operation. This adjustment is manually accomplished by grasping the headed latch pin 202 and retracting its latching inner end portion 204 from one of the latching recesses 205 in the stationary latch plate 206, against the action of the coil spring 203 (FIG. 39) and then rotating the handle arm 167, shaft 165 and the eccentric cam member 164 on the shaft 165 within the eccentric bearing opening 163 in the cam follower 162. This motion acts through the rod 167 and the depending extension 137, to raise or lower the threaded forming die head 136, as desired, relative to the forming mandrels 73, so as to control and vary the depth of the crests 47 and intervening valleys 48 to be formed in the flexible areas 46 of the tubular straw members 43. After the desired adjustment has been made the threaded forming die body 136 and associated parts are secured in the desired adjusted position by engaging the latching inner end portion 204 of the latch pin 202 in a selected one of the latch openings 205 in the stationary latch plate 206.

Pressure belt device for pressing the tubular straw members against the heated forming die unit As each of the tubular straw members 43 moves into engagement with the heated forming die unit 77 it comes under and is engaged by a pressure belt device, which is generally indicated at 78 (FIGS. 1, 9, 10, 13, 36 and 37) and which includes a flexible pressure belt 79 which forces the tubular straw members 43 (on its mandrel 73) against the heated forming die unit 77 so that the tubular straw member 43 is held to the proper spacing between the heated forming die unit 77 and the flexible pressure belt 79 during the operation of forming the ribbed flexible area 46 in the tubular straw member 43.

The pressure belt device 78 includes an air cylinder 179 which is arranged above the carrier drum 60 and in alignment with the heated forming die unit 77 (FIGS. 1 and 36). A piston 180 is slidably mounted in the air cylinder 179 and a piston rod 181 is attached to the piston 180 and has a portion 182 which projects exteriorly of and below the air cylinder 179. This depending portion 182 of the piston rod 181 has a head 183 thereon, which bears against the top wall 184 of a generally triangular-shaped and relatively fixed supporting guiding frame 140 which includes a pair of parallel side walls 190. The frame 140 is rigidly attached to the main supporting frame 41, as at 156 (FIGS. 10 and 13). A pair of belt guiding rollers 141 are rotatably mounted in the parallel side walls 190 of the frame 140 in spaced relationship and a third and relatively movable belt guiding roller 177 is mounted between the side walls 191 of a relatively movable yoke member 192, which is attached, as at 194, to the bottom wall 195 of the air cylinder 179 (FIG. 36). The flexible pressure belt 79 works around the guide rollers 177 and 141. A coil spring 193 is mounted in the air cylinder 179 below the piston 180. An air inlet 183 is provided in the air cylinder 179 above the piston 180, as shown in FIG. 36.

The pressure belt 79 is normally somewhat slack in its working position over the threaded forming surface 120 of the heated forming die unit 77. However, in order to tighten the pressure belt 79, and to control and vary the pressure thereof on the straw members 43 as they are moved across the threaded die forming surface 120 of the heated forming dies unit 77, air may be admitted through the line 183 into the air cylinder 179 above the piston 180 thereby forcing the piston rod 181–182 downwardly against the action of the resetting coil spring 193. However, since the frame 140 and the belt guiding rollers 141 carried thereby are fixed and stationary, due to the attachment of the frame 140 to the main supporting frame 41, pressure exerted by the piston rod 181–182 acts through the relatively movable yoke member 192 to urge the air cylinder 179 upwardly, thereby raising the uppermost belt guiding roller 177, which is carried by the yoke member 192, and thus tightening the flexible pressure belt 79 around the belt guiding rollers 141–177.

As the mandrels 73 and the tubular drinking straw members 43 move through the space between the flexible pressure belt 79 and the threaded surface 120 of the heated forming die unit 77, the straw members 43 engage the flexible pressure belt 79 and move the latter on and relative to the belt guiding rollers 141–177 at a speed commensurate with the peripheral speed of the straw members 43 and the mandrels 73. Hence, the mandrels 73 and the tubular straw members thereon roll on and over the threaded surface of the heated forming die unit 77, with the result that there is no sliding or slipping action of the tubular straw members over the threaded surface of the heated forming die unit 77. In addition, since the pressure belt 79 is mounted on the belt guiding rollers 141 and 177, the action of the mandrels 73 and the tubular straw members thereon causes the pressure belt 79 to move at a rate which is directly related to the speed of rotation of the tubular straw members on the mandrels 73. In the typical and preferred embodiment of the invention shown in the drawings, there are at least four tubular straw members (on their supporting mandrels 73) in contact at any one time with the threaded surface 120 of the heated forming die unit 77 sufficient frictional drag on the pressure belt 79 is provided to move the pressure belt 79 without any appreciable slippage. Hence, it will be seen that the pressure belt 79 is moved by the frictional engagement therewith of the tubular straw members 43 on their supporting mandrels 73. However, the size and shape of the threaded surface 120 of the heated die-forming unit and the number of threads embodied therein may be varied, as desired.

Straw retarder members

After the flexible area 46 is thus formed in each drinking straw 44 the completed drinking straw member 44 is carried by the rotating carrier drum or cylinder 60 into engagement with a pair of straw retarder members in the form of friction drag bars 80 which are mounted on the supporting frame 41 and bear against the completed straws 44 after the forming operation. These friction drag bars 80 engage the complete straw-member 44 and retard its axial motion in its pocket 59 in the carrier drum 60 after it has been retracted from the mandrel 73 by the corresponding one of the straw-pushing and gripping devices 72, following the completion of the forming operation, thereby enabling the combination straw-pushing and gripping device 72 to be retracted free from the adjacent end portion of the corresponding formed tubular straw member 44.

Straw discharge device

After the forming operation the completed straw member 44 engages a discharge mechanism, which is generally indicated at 81 (FIG. 30) and which includes a plurality of spaced straw discharge finger members 82 which are mounted on a horizontal supporting bar 83 which is carried by a series of spaced truncated cylindrical members 145 which are carried by a horizontally extending supporting shaft 146 which, in turn, is mounted on spaced upright supporting pedestals 147 which are mounted on the supporting frame 41 adjacent the outer peripheral surface of the carrier drum or cylinder 60 (FIGS. 4, 8 and 30). Each of the straw discharge finger members 82 projects into and works in a circumferentially extending slot 84 which is formed in the outer peripheral surface of the carrier drum 60 and, as best shown in FIG. 30, the straw discharge finger members 82 engage the completed straw members 44 and direct them into a generally horizontally extending discharge outlet 84 from which they are propelled by their own momentum downwardly onto the inclined bottom wall 85 of a receiving tray 86 from which the completed drinking straws 44 may be removed for use (FIG. 30). The receiving tray or receptacle 85–86 is carried by the supporting rod 145 and supporting pedestals 146 (FIG. 30).

Carrier drum driving mechanism

As shown in FIG. 1 the carrier drum or cylinder 60 is rotated by the driving mechanism 64 which is mounted in the supporting frame 41. This driving mechanism 64 includes a drive chain 85 which is operatively connected to a suitable power source such as an electric motor and power transmission unit (not shown). The drive chain 85 meshes with a sprocket 86 which is mounted on a horizontally extending shaft 87 which is rotatably mounted in a supporting structure 188 carried by the supporting frame 41. At its axially inner end the shaft 87 carries a gear 89 which meshes with a gear 90 which is carried by a horizontally extending shaft 91 which is suitably journalled in bearing structures 92 carried by the supporting frame 41. The shaft 91 carries a gear 93 which meshes with a ring gear 94 which is mounted on a mandrel gear housing 121 which is arranged at one end of the carrier drum 60 and is fastened to the shaft 61 (FIGS. 1, 2, 3, 5, 6, 8, 9 and 11).

In addition, the carrier drum 60 has a hub portion 148 at its other end which is fastened to the shaft 61 and a second ring gear 149 is mounted on the hub portion 148. This ring gear 149 meshes with a gear 150 on shaft 91 (FIGS. 1, 9 and 11).

Hence, it will be seen that when the drive chain 85 is operated by the power sources or motor and power transmission unit (not shown) power will be delivered through the drive chain 85, sprocket 86, shaft 87, gear 89, gear 90, shaft 91 and gear 93 to the ring gear 94 on the mandrel gear housing 121 which is rotatably mounted on the shaft 61 while, at the same time, power is delivered by the shaft 91 to the gear 150 and thence to the gear 149 on the hub portion 148 of the carrier drum 60. In this manner the mandrel gear housing 121 and the forming mandrels 73 carried thereby are rotated in synchronism with the carrier drum 60 and relative to the stationary supporting shaft 61.

Operating means for the straw-feeding brushes

The upper brush-supporting shaft 52 carries a drive pulley 95 which is operatively connected by a belt 96 to a pulley 97 on the supporting shaft 56 for the lower straw-feeding brushes 55. The pulley 97, in turn, is connected by a drive belt 98 to a pulley 99 which is carried by a horizontally extending shaft 100 which is suitably mounted in the supporting frame 41 adjacent the lower end thereof (FIGS. 1 and 31). The shaft 100 carries a gear 101 which meshes with a drive chain 102 which meshes with a gear 103 carried by the drive shaft 91 (FIG. 1).

Hence, it will be seen that when the drive shaft 91 is rotated to rotate the mandrel gear housing 121 and the mandrels 73 carried thereby, and also to rotate the carrier drum or cylinder 60, power is transmitted from the drive shaft 91 through the gear 103, drive chain 102, gear 101, shaft 100, pulley 99, belt 98, pulley 97, shaft 56, belt 96, pulley 95 and shaft 52 to rotate the upper straw feeding brushes 51 (clockwise, FIG. 30). During this operation, the outer peripheral edge portions of the upper straw feeding brushes 51 rotate in the slots 54 formed in the inclined bottom wall 50 of the feeder hopper 42 and propel the excess or bulk of the tubular straw members 43 upwardly and allowing only a single straw member 43 to enter at one time into the restricted feeder throat or outlet 53 and into the lower inwardly angled and horizontally extending end portion 58 thereof along which the tubular straw members 43 are propelled by the lower set of straw feeding brushes 55, which are mounted on the shaft 56, and which project into and rotate in the slots 57 which are formed in the upper wall 104 of the lower and inwardly angled end portion 58 of the restricted feeder throat or outlet 53. During this operation the supporting shaft 56 and the lower set of straw feeding brushes 55 carried thereby are rotated by the drive belt 96, pulley 97, shaft 56 and drive belt 98 (FIGS. 1, 30 and 31).

Combination straw-pushing and gripping devices and the operating mechanism therefor As best shown in FIGS. 18 to 23 and 32 to 35, both inclusive of the drawings, each of the combination straw-pushing and gripping devices 73 includes an elongated supporting slide rod member 105 which is suitably guided in and by a generally channel-shaped guide member 162 which is mounted on and fastened to the carrier drum 60 on the outer peripheral surface thereof; it being noted that there are a plurality of such guide members 162 spaced radially around the carrier drum 60.

Thus, by reference to FIGS. 32 to 34, inclusive, it will be noted that each of the channel-shaped guide members 162 overlies and extends axially of one of the straw-receiving slots or pockets 59 in the outer peripheral surface of the carrier drum 60. Each of the supporting slide rod members 105 has a cam follower 106 mounted on its upper or outer surface and each of these cam followers 106 works in a cam trackway 107 which is generally U-shaped in cross section (FIG. 17) and extends in a preselected irregular or tortuous pattern circumferentially of and around the carrier drum or cylinder 60 radially outwardly thereof.

As shown in FIG. 17, the base 149 of the cam trackway 107 is fastened, as at 150, to a supporting plate 151 which is attached to an angle iron supporting member 152 which forms a part of the supporting frame 41. The cam trackway 107 has parallel sidewalls 153 each of which has an inwardly angled outer end portion 154 and a generally cylindrical-shaped anti-friction cam track guide member 155 is mounted in and is fastened to each of the inwardly angled side walls 153 of the cam trackway 107.

Each of the supporting slide rod members 105 has a combination straw-pushing and gripping head 108 pivotally mounted thereon, as at 109, and each of these heads 108 has a straw pusher rod 110 attached thereto at its inner end (FIGS. 18 to 23 and 32 to 34, inclusive). Each of the straw pusher rods 110 has a cone-shaped inner end or nose portion 111 (FIGS. 32 and 35). Each of the heads 108 also has a depending straw pushing and gripping arm or member 112 at its inner or front end and each of these straw pushing and gripping arms or members 112 has a convexly upwardly curved arcuate slot or groove 113 formed in its lower surface for the reception of a part of one of the tubular straw members 43 (FIGS. 32 and 35), as will be described more fully hereinafter.

Each of the supporting slide rod members 105 has a recess 114 formed in its upper or outer surface and a resetting coil spring 115 has its lower end portion mounted in the recess 114. The upper end portion of each of the resetting coil springs 115 bears on the top wall 116 of the head 108 so as to urge the head 108, on its pivot 109, into its normal and generally horizontal position, as in FIGS. 18, 19, 21, 22, 23 and 35.

A cam roller 117 is rotatably mounted on a depending flange 118 of the top wall 116 of each head 108 (FIGS. 18–23 and 32–35) and each of these cam rollers 117 is adapted to successively engage the cam surface 186 of a stationary cam member 119, which is mounted on the supporting frame 41, as at 189 (FIG. 3), as the heads 108 rotate with the carrier drum 60, as will be explained more fully hereinafter.

In operation, the supporting slide rod members 72 and the combination straw-pushing and gripping heads 108 and the cam followers 106 carried by the supporting slide rod members 105 rotate with the carrier drum or cylinder 60, and during this rotation the cam followers 106 travel through the irregularly-shaped or tortuous stationary cam trackway 107 in which they are guided by the anti-friction cam track members 155 (FIG. 17). This motion of each of the cam followers 106 in the cam trackway 107 moves the corresponding slide rod member 105 and the combination straw pushing and gripping head 108 carried thereby axially of the carrier drum 60, and thereby moves the cone-shaped nose or end portion 111 of the pusher rod 110 into the end portion of one of the tubular straw members 43, which is disposed in one of the straw-receiving slots 59 in the outer peripheral surface of the carrier drum or cylinder 60, while at the same time, the depending straw-pushing and gripping arm 112 engages the adjacent end wall of the tubular straw member 43 and pushes it axially onto the corresponding forming mandrel 73 (from the position in which the tubular straw member 43 is shown in FIG. 18 into the position in which it is shown in FIG. 19).

As the carrier drum or cylinder 60 continues to rotate, the tubular straw member 43 thus pushed onto the corresponding forming mandrel 73—75—76 is moved into a position between the threaded or ribbed surface 120 of the heated forming die unit 77 and the tubular straw member 43 is forced by the pressure belt 79 against the threaded or ribbed forming surface 120 of the heated forming die unit 77. This operation heats and softens the tubular plastic resinous straw member 43 which is disposed in contact with the threaded or ribbed forming or molding surface 120 and, in cooperation with the corresponding one of the rotating forming mandrels 73, forms or molds the ridges or crests 47 and the intervening valleys 48 and interconnecting web portions 49 in the flexible area 46 of the tubular straw member 43 as the latter is rotated on and by its supporting mandrel 73 (in a manner which will be described hereinafter) and is urged into contact with the heated forming die unit 77 by the flexible pressure belt 79.

At this point in the operation of each of the combination straw-pushing and gripping heads 108, that is to say, when the tubular straw member 43 is moved on its forming mandrel 73 into position between the heated forming die unit 77–120 and the pressure belt 79 to form the flexible area 46 therein, the cam roller 117 on each of the heads 108 comes into engagement with the stationary cam member 119, and as shown in FIG. 20, this action pivots the head 108, at 109, against the action of the resetting spring 115, into the position in which the head 108 is shown in FIG. 20, thereby moving the depending arm member 112 on the head 108 out of engagement with the tubular straw member 44.

As the carrier drum or cylinder 60 continues to rotate the cam roller 117 on the head 108 moves beyond and out of contact with the stationary cam member 119 and the resetting coil spring 115 then pivots the head 108, at 109, from the position in which the head 108 is shown in FIG. 20, into the position in which the parts are shown in FIG. 21, thereby moving the depending arm member 112 on the head 108 and the grooved or notched surface 113 thereof, into clamping or gripping engagement with the adjacent end portion of the tubular straw member 44. This action of the depending arm member 112 and its grooved or notched surface 113 exerts a downward pressure and a clamping or gripping action on the completed tubular straw member 44 and, as the carrier drum or cylinder 60 continues to rotate, the retrograde movement of the cam follower 106 in the tortuous cam trackway 107 moves the supporting slide member 72 and the combination straw pushing and gripping head 108–112 carried thereby in such a manner as to move the completed tubular straw member 44 (with which the notched clamping or gripping surface 113 of the depending arm member 112 is in contact) completely off from the threaded section 75 of the supporting mandrel 73, and from the position in which the completed straw member 44 is shown in FIG. 21 into the position in which it is shown in FIG. 23.

As the carrier drum 60 continues to rotate the cam rollers 117 on the head 108 engage the cam surface 187 of a cam member 188 which is stationarily mounted on the supporting frame 41 adjacent to but in advance of the receiving tray 86 (FIGS. 2 and 30), thereby pivoting the heads 108 into open or raised position so as to allow the formed tubular straw members 44 to be ejected from the carrier drum 60.

The thus formed and completed tubular straw members 44 are then carried by the rotation of the carrier drum 60 into engagement with the discharge fingers 82 of the discharge mechanism 81 by which they are directed into the discharge throat 84 and thence into the receiving tray 85–86 (FIG. 30).

*The forming mandrels and the supporting and operating means therefor*

The new straw forming machine 40 includes a generally cylindrical mandrel gear driving member 122 which floats, that is, is rotatably mounted on the supporting shaft 61 for the carrier drum 60 at one end portion thereof (FIGS. 1 and 11). The mandrel gear driving member 122 has a gear 123 thereon which meshes with the gear 89 on the shaft 87 (FIG. 11). The mandrel gear driving member 122 has an enlarged internal annular flange 124 which projects into the body of the mandrel gear housing 121 and this annular flange 124 has a master mandrel driving ring gear 125 fastened thereto on its outer peripheral surface (FIGS. 11, 12 and 16).

The mandrel gear housing 121 includes an annular radially outer peripheral wall 126 to the radially inner and axially outer end surface of which is attached an annular bearing plate 127 (FIGS. 11, 12 and 16). Each of the forming mandrels 73 has an enlarged bearing portion 128 at its axially outer end and each of these bearing portions 128 is rotatably journalled in a bearing race 129 which is mounted in a recess or cavity 130 provided therefor in the annular bearing plate 127 (FIG. 12). Each of the forming mandrels 73 also has an enlarged axially inner bearing portion 131 which is rotatably journalled in a bearing race 132 which is mounted in a cavity or recess 133 provided therefor in the annular axially inner end wall 134 of the mandrel gearing housing 121 (on which the driving ring gear for the mandrel gear housing 121 is mounted) (FIGS. 11, 12 and 16). Each of the forming mandrels 73 has an individual mandrel operating gear 135 thereon and each of the individual mandrel operating gears 135 meshes with the master mandrel driving gear 125 on the axially inner annular end wall 124 of the mandrel gear housing 121. The individual mandrel operating gears 135 are staggered relative to each other axially of the forming mandrels 73 so as to enable the full surface of the relatively larger master mandrel driving gear 125 to be utilized with the relatively smaller individual mandrel operating gears 135 (FIGS. 11, 12 and 16).

The construction and mounting of the forming mandrels 73, mandrel housing 121, mandrel gear driving member 122, and associated parts, is such that in operation when power is delivered to the drive chain 85 and to the sprocket 86 to drive the shaft 87, and thence through the parts 89–90–91–93 and 94, 150–149–148 to rotate the mandrel gearing housing 121 and the carrier drum 60, the mandrel housing 121 is rotated in a counterclockwise direction, as seen in FIG. 1.

During this operation of the mandrel gear housing 121 and the forming mandrels 73 carried thereby (counterclockwise as seen in FIG. 1) rotation of the shaft 91, acts through the gears 90–89–123 to rotate the mandrel gear driving member 122 on the shaft 61 in a direction (clockwise, as seen in FIG. 1) opposite to the direction of rotation of the mandrel gear housing 121 and the carrier drum 60. This rotation of the mandrel gear driving member 122 acts, through the annular inner flanges 134 thereof, to rotate the master mandrel driving gear 125 which, in turn, acts to rotate all of the individual mandrel operating gears 135 and the forming mandrels 73 which are thus rotated in the bearing units 129 and 132 (FIG. 12).

Thus it will be seen that as the forming mandrels 73 are rotated by the mandrel housing 121, the mandrel housing 121 and the forming mandrels 73 carried thereby are rotated in unison with the carrier drum 60 and the parts carried thereby and the forming mandrels 73 are all individually rotated in synchronism by the master mandrel driving gear 125 and the individual mandrel operating gears 135 so as to rotate the threaded portions 75 of the forming mandrels 73 when the tubular straw members 43 are disposed thereon between the heated forming die unit 77–120 and the flexible pressure belt 79 to form the flexible area 46 in the tubular straw members 43.

SUMMARY OF OPERATION

By way of summary, therefore, the operation of the new straw forming machine is as follows:

When power is applied to the drive chain 85 it acts through the sprocket 86, shaft 87, gear 89, gear 90, shaft 91, ring gear 94 to rotate the mandrel housing 121 while, at the same time, the shaft 91 acts through the gears 150 and 149 and the hub portion 148 to rotate the carrier drum 60 on the stationary shaft 61 (counterclockwise, as seen in FIG. 1).

As the mandrel housing 121 and the carrier drum 60 are thus rotated, the mandrel gear driving member 122 is also rotated by way of the shaft 91 and gears 90–89–132, and this rotation of the mandrel driving member 122 acts, through the master mandrel driving gear 125 thereon, to rotate all of the individual mandrel operating gears 125, thereby rotating all of the forming mandrels 73 in their bearing race supports 129 and 132 (FIGS. 11, 12 and 16). As the forming mandrels 73 are thus rotated by and with the mandrel housing 121 (and with the carrier drum), while at the same time, being individually rotated in their bearing race mountings 129 and 132, the tubular straw members 43 are fed by gravity from the storage or feeder hopper 42 down the inclined bottom wall 50 thereof where they are engaged by the upper straw-feeding brushes 51 which project through the slots 54 in the inclined wall 50 of the storage hopper 42 so as to move the bulk or excess of the tubular straw members 43 upwardly and thus allow only a single straw member to enter at one time into the restricted vertically extending throat or outlet portion 53 of the storage or feeder hopper 42 (FIG. 30). As the tubular straw members drop down into the restricted throat or outlet 53 of the feeder or storage hopper 42 they are further engaged by the lower set of straw-feeding brushes 55 which project through the slots 57 in the top wall 104 of the lower horizontally extending portion 58 of the restricted throat or outlet 53. The tubular straw members 43 are thus propelled out of the restricted throat 53–58–104 into the straw-receiving slots or sprockets 59 which are formed in the outer peripheral surface of the carrier drum 60 by which they are carried up under the straw-retaining pressure bar 40 which is urged by the weight 70, into contact with the tubular straw members 43 so as to retain them in the slots or pockets 59 in the carrier drum 60, during their upward movement with the carrier drum 60 in the first part of its rotational cycle.

During this operation, as aforesaid, the straw-feeding brushes 51–55 are rotated by power applied from the shaft 91 through the chain 102, gear 101, pulley 99, belt 98, pulley 97, shaft 56, belt 96, pulley 95 and shaft 52.

As the tubular straw members 43 are thus carried through the initial portion of the 360° cycle or rotation of the carrier drum 60, that is, through Zone 1 which comprises approximately 87° of arc of the cycle of rotation of the carrier drum 60 (FIG. 27), the tubular straw members 43 are moved by the combination straw-pushing and gripping devices 72 onto the forming mandrels 73. As pointed out hereinbefore, this is accomplished by the travel of the cams 106 in the tortuous irregularly-shaped cam trackway 107, which acts to move the combination straw-pushing and gripping devices 72 and the heads 108 thereon from right to left, as seen in FIGS. 9, 11 and 18. During this operation, the cone-shaped nose portion 111 of the pusher rod member 110 on the head 108 of each of the combination straw-pushing and gripping devices 72 engages the adjacent end portion of one of the tubular straw members 43 and slides the straw member 43 axially on the carrier drum 60 in its slot or pocket 59, thereby moving the opposite end portion of the tubular straw member 43 onto the cone-shaped nose portion 76 and onto the threaded portion 75 of the corresponding forming mandrel 73. Thus, during this operation, each of the combination straw-pushing and gripping devices 72–108 moves from the position in which it is shown in FIG. 18 to the position in which it is shown in FIG. 19, and at which time the tubular straw member 43 is thus advanced onto the mandrel 73 and the threaded portion 75 thereof.

During the time the tubular straw member 43 is thus being advanced onto the forming mandrel 73 it is free to rotate but will not rotate positively until that portion thereof in which the flexible area 46 is to be formed comes between the flexible pressure belt 79 and the threaded die-forming surface 120 of the heated forming die unit 77.

As shown in FIGS. 5, 10 and 13, in the typical and preferred embodiment of the invention shown in the drawings, the threaded die-forming surface 120 of the heated die unit 77 spans an arc on the peripheral surface of the carrier drum 60 which is sufficient to accommodate a plurality of forming mandrels 73 at one time, with the tubular straw members 43 thereon disopsed over the threaded forming surface 120 of the heated forming die unit 77 and between the latter and the flexible pressure belt 79 at a given time during the rotational cycle of the carrier drum and the mandrel housing 121 and the forming mandrels 73 carried thereby.

When the parts are in this position, those portions of the tubular straw members 43 which are disposed in contact with the threaded portions 75 of the mandrels 73 are thus pressed by the flexible pressure belt 79 into engagement with the heated die-forming surface 120 of the heated die unit 77, and a portion of the plastic resinuous material of which each of the tubular straw members 43 is composed is thus softened and the flexible threaded area 46 is formed therein by rotation of the forming mandrel 73 in contact with the die-forming surface 120 of the heated die unit 77.

During the operation of forming the flexible area 46 in the tubular straw members 43 the tubular straw members 43 rotate at the same speed as the forming mandrels 73 by which they are carried.

Immediately prior to the time the tubular straw members 43 enter the forming area between the pressure belt 79 and the threaded forming surface 120 of the heated forming die body 136, the cam rollers 117 on the heads 108 engage the cam surface 186 of the stationary cam member 119, thereby pivoting the heads 108 into raised or open position, as in FIG. 20, and thus permitting free rotation of the tubular straw members 43 on and with their supporting mandrels 73 during the forming operation.

It will be noted, in this connection, that immediately after the tubular straw members 44 and the forming mandrels 73 on which they are mounted, have passed out of the forming area between the heated forming die unit 77 and the pressure belt 79, the cam rollers 117 on the heads 108 pass beyond the cam surface 186 of the cam 119, whereupon the heads 108 and the combination clamping and pushing members 112 thereon, are urged firmly downwardly onto the formed tubular straw members 44 by the action of the springs 115, as shown in FIG. 21, thereby preventing further rotation of the formed tubular straw members 44 on their supporting mandrels 73. The movement of the cam rollers 106 in the cam trackway 107 thereupon retracts the combination straw pushing and straw gripping device 72, and the formed tubular straw member 44 engaged thereby, axially on the carrier drum 60 away from the forming mandrels 73, at the same relative speed at which the formed tubular straw members 44 are withdrawn or unthreaded from the forming mandrels 73.

However, when the end portions of the formed tubular straw members 44 are almost free of the end portions of their supporting mandrels 73, the formed tubular straw members 44 engage the friction drag bars 80 which retard axial movement of the formed tubular straw members 44 in their pockets 59 in the carrier drum 60 so that the straw-pushing and gripping members 72 can be retracted free of the adjacent end portion of the formed tubular straw member 44.

It will be noted that the rate at which the formed tubular straw members 44 are retracted from their forming mandrels 73 is directly related to and is commensurate with the rate at which the rotating forming mandrels 73 are unscrewed from the formed tubular straw members 44 so that the formed tubular straw members 44 and the flexible areas 46 thereof are not torn or distorted during the operation of retracting the formed tubular straw members 44 off from their forming mandrels 73.

Further movement of the cam roller 106 in the tortuous cam trackway 107 thereupon moves the combination straw pushing and gripping device 72 and its head 108 from the position in which the parts are shown in FIGS. 21 and 22 into the position in which they are shown in FIG. 23.

As the carrier drum 60 continues to rotate the thus formed tubular straw members 44 pass under and beyond the friction drag bar members 80 and in the final phase of the cycle of rotation of the carrier drum 60 the cam rollers 117 on the heads 108 of the combination pushing and gripping devices 72 engage the cam surface 187 of the cam member 188 (FIG. 8) thereby pivoting the heads 108 into open or raised position so that the combination straw-pushing and gripping device 72 can be retracted completely free from the end portion of the formed tubular straw member 43 and so that the formed tubular straw members 44 maybe discharged from the carrier drum 60. The formed tubular straw members 44 then engage the discharge fingers 82 of the discharge unit 81 by which they are ejected from their slots or pockets 59 in the carrier drum 60 into the horizontally extending discharge throat 84 from which they fall, by gravity, onto the inclined bottom wall 85 of the tray receptacle 86 from which they may be removed for sale and use.

It will be noted that in the operation of the new straw forming machine the forming mandrels 73 are all rotated in synchronism so that when the tubular straw members thereon come into engagement with the threaded or ribbed forming surface 120 of the heated forming die unit 77, the tubular straw members 43 are rotated in synchronism relative to their own individual rotational movement and also relative to their planetary rotary motion on the carrier drum 60 as they move across the forming surface 120 of the heated die forming unit 77 so that no rupturing or tearing force is applied to the tubular straw members 43 as they are rotated in engagement with and across the threaded or ribbed surface 120 of the heated forming die unit 77 during the forming operation.

As the mandrel housing 121, carrier drum 60, mandrel driving member 122 and associated parts continue to rotate the cycle of operations thus described is repeated within the time sequences and within the time zones illustrated in FIG. 27 of the drawings, and which will now be described.

Time sequence of operations in a cycle of rotation of the carrier drum

As is shown diagrammatically in FIG. 27, the construction, arrangement and operation of the parts embodied in the new straw-forming machine 40, as described above, are such that for each complete cycle of rotation of 360° of the carrier drum or cylinder 60, mandrel housing 112, mandrel driving member 122, forming mandrels 73 and associated parts, the operation of loading the tubular straw members 43 on the forming mandrels 73 takes place in Zone 1 which covers approximately the first 87° of arc in the rotational cycle of the carrier drum 60; the operation of forming or molding the ribbed flexible area 46 in the tubular straw members 43 takes place in Zone 2, which covers approximately the next 45° of arc in the rotational cycle; the first phase of the operation of retracting the molded or formed tubular straw members 44 from the forming mandrels 73 takes place in Zone 3, which covers approximately the next 132° of arc in the rotational cycle; the second and final phase of fully retracting the formed or molded tubular straw members 44 from the forming mandrels 73 takes place in Zone 4, which covers approximately the next 64° of arc in the rotational cycle; and the operation of discharging the completely molded or formed straw members 44 from the carrier drum or cylinder 60 into the receiving tray or receptacle 85–86 takes place in Zone 5 which covers approximately the final arc of 32° in the rotational cycle.

It will also be noted that the operational time sequences of the heads 108 of the combination straw pushing and gripping devices 72 in relation to the cams 118 and 188 and in relation to the friction drag bars 80 are shown in FIG. 27.

It will thus be seen from the foregoing description, considered in conjunction with the accompanying drawings, that the present invention provides a new and improved machine for forming a flexible ribbed or corrugated area in tubular plastic resinous drinking straw members and that the invention thus has the desirable advantages and characteristics and accomplishes its intended objects including those hereinbefore pointed out and others which are inherent in the invention.

I claim:

1. A machine for forming a ribbed flexible area in tubular plastic resinous drinking straw members comprising:

(1) a rotatable carrier member adapted to carry a plurality of tubular plastic resinous drinking straw members arranged at spaced intervals circumferentially therearound;
(2) means for supporting the said rotatable carrier member;
(3) means for rotating the said rotatable carrier member with the said tubular drinking straw members thereon;
(4) a plurality of threaded forming members carried by and rotatably mounted on the said carrier member at spaced intervals circumferentially therearound and each adapted to support one of the said tubular plastic resinous drinking straw members threaded thereon;
(5) means for moving the said tubular plastic resinous drinking straw members onto the said rotatable threaded forming members;
(6) heated forming die means including a die-forming surface arranged in the path of rotational travel of the said threaded forming members with the said carrier member; and
(7) means for rotating the said threaded forming members and the said tubular plastic resinous drinking straw members carried thereby on the said rotatable carrier member in synchronism and successively into engagement with the said die-forming surface of the said heated forming die means so as to form the said ribbed flexible areas in the said tubular plastic resinous drinking straw members.

2. A machine as defined in claim 1 in which a plurality of the said threaded forming members and of the said tubular drinking straw members carried thereby are moved simultaneously over and in engagement with the said die-forming surface.

3. A machine as defined in claim 1 which includes:
(1) means for adjusting the said die-forming surface of the said heated die-forming means relative to the said threaded forming members so as to vary the depth of the said ribbed flexible area formed in the said tubular plastic resinuous drinking straw members.

4. A machine as defined in claim 1 which includes:
(1) flexible pressure belt means for urging the said tubular plastic resinous drinking straw members into engagement with the said die-forming surface of the said heated die-forming means.

5. A machine as defined in claim 4 in which the said flexible pressure belt means includes:
(a) a flexible pressure belt;
(b) means for movably mounting the said flexible pressure belt for movement across and relative to the said die-forming surface of the said heated die-forming means; and in which
(c) the said tubular plastic resinous drinking straw members engage the said flexible pressure belt and move the said flexible pressure belt relative to and across the said die-forming surface as the said tubular drinking straw members are rotated by the said threaded forming members over and in contact with the said die-forming surface.

6. A machine as defined in claim 5 in which the said threaded forming members are in the form of threaded mandrels.

7. A machine as defined in claim 1 which includes:
(1) flexible pressure belt means for urging the said tubular plastic resinous drinking straw members into engagement with the said die-forming surface of the said heated die-forming means; and
(2) means for adjusting the pressure of the said flexible pressure belt means on the said tubular plastic resinous drinking straw members.

8. A machine as defined in claim 1 which the said carrier drum has
(1) a plurality of straw-receiving pockets therein spaced circumferentially therearound for holding the said plastic resinous drinking straw members.

9. A machine as defined in claim 1 in which the said carrier drum has
(1) a plurality of straw-receiving pockets therein spaced circumferentially therearound for holding the said tubular plastic resinous drinking straw members; and in which the said machine includes
(2) a receptacle for receiving the formed tubular plastic resinous drinking straw members from the said carrier drum after the completion of the forming operation; and
(3) means for ejecting the formed tubular plastic resinous drinking straw members from the said pockets in the said carrier drum into the said receptacle.

10. A machine as defined in claim 1 which the said carrier drum has
(1) a plurality of straw-receiving pockets therein spaced circumferentially therearound for holding the said tubular plastic resinous drinking straw members; and in which the said machine includes
(2) a receptacle for receiving the formed tubular plastic resinous drinking straw members from the carrier drum after the completion of the forming operation;
(3) means for ejecting the formed tubular plastic resinous drinking straw members from the said pockets in the said carrier drum into the said receptacle;
(4) means for retarding rotary motion of the formed drinking straw members on the said threaded forming members after the completion of the die-forming operation; and
(5) means for retracting the die-formed tubular drinking straw members axially in the said pockets in the said carrier drum and away from the said threaded forming members after the completion of the die-forming operation.

11. A machine as defined in claim 9 which includes:
(1) a feeder or storage hopper for holding a supply of said tubular plastic resinous drinking straw members; and
(2) means for feeding the said tubular plastic resinous drinking straw members one at a time from the said feeder or storage hopper into the said straw-receiving pockets in the said carrier drum.

12. A machine as defined in claim 9 which includes:
(1) a feeder or storage hopper for holding a supply of said tubular plastic resinous drinking straw members; and
(2) means including rotary brushes for feeding the said tubular plastic resinous drinking straw members one at a time from the said feeder or storage hopper into the said straw-receiving pockets in the said carried drum.

13. A machine as defined in claim 9 which includes:
(1) a feeder or storage hopper for holding a supply of said tubular plastic resinous drinking straw members; and in which the said feeder or storage hopper includes a body having:
(a) a restricted throat or outlet portion having
(b) communication at its lower end with the said straw-receiving slots or pockets in the said carrier drum; and in which the said restricted throat or outlet of the said feeder or storage hopper includes
(2) a wall having:
(a) an opening therein;
(3) means for feeding the said tubular plastic resinous wall members sequentially from the said feeder or storage hopper into the said straw-receiving slots or pockets in the said carrier drum including:
(a) a rotary straw-advancing brush member having a portion adapted to project into the said opening in the said wall of the said restricted throat or outlet so as to propel the said tubular plastic resinous straw members therealong into the said straw-receiving slots or pockets in the said carrier drum;
(4) means for supporting the said rotary straw-advancing brush member; and
(5) means for rotating the said rotary straw-advancing brush member.

14. A machine as defined in claim 13 which includes:
(1) means for feeding the said tubular plastic resinous drinking straw members one at a time from the body of the said feeder hopper into the said restricted throat or outlet portion thereof.

15. A machine for forming a flexible area in the body of a tubular plastic resinous drinking straw member, comprising:
(1) a generally cylindrical rotatable carrier drum having on its outer peripheral surface
    (a) a plurality of generally parallel straw-receiving slots or pockets extending axially of the said rotatable carrier drum and spaced at intervals radially therearound;
(2) means for supporting the said generally cylindrical carrier drum;
(3) means for rotating the said rotatable carrier drum;
(4) a storage hopper for tubular plastic resinous drinking straw members;
(5) means for feeding tubular plastic resinous drinking straw members sequentially from the said storage hopper into the said straw-receiving slots or pockets in the said rotatable carrier drum;
(6) heated die-forming means;
(7) threaded rotatable forming members for supporting the said tubular plastic resinous straw members on the said carrier drum and for rotation therewith and for rotating them successively into engagement with the said heated die-forming means; and
(8) means carried by the said rotatable carrier drum for moving the said tubular plastic resinous drinking straw members in the said straw-receiving slots or pockets in the said rotatable carrier drum onto the said threaded forming members.

16. A machine as defined in claim 15 which includes:
(1) a receptacle for receiving the completed drinking straw members from the rotatable carrier member after completion of the forming operation; and in which the said receptacle has
(2) a restricted throat or inlet for the reception of completed straw members from the said straw-receiving slots or pockets in the said carrier drum;
(3) means for discharging the completed flexible tubular plastic resinous straw members from the said carrier drum into the said receptacle including
(4) a circumferentially extending groove formed in the outer peripheral surface of the said carrier drum and intersecting the said straw-receiving slots or pockets therein; and
(5) a straw-ejecting member projecting into the said circumferentially extending groove in the said carrier drum adjacent the said restricted straw members from the said receptacle for ejecting completed straw members from the said straw-receiving slots or pockets in the said carrier drum into the said restricted throat or inlet to the said receptacle; and
(6) means for supporting the said straw-ejecting member with a portion thereof projecting into the said circumferentially extending groove in the said carrier drum.

17. A machine as defined in claim 16 in which the said receptacle for receiving the completed flexible tubular plastic resinous straw members has
(1) a restricted throat or inlet for the reception of the completed straw members from the said straw-receiving slots or pockets in the said carrier drum; and in which the said carrier drum has
(2) a plurality of spaced circumferentially extending grooves in the said carrier drum intersecting the said straw-receiving slots or pockets therein;
(3) a plurality of straw-ejecting members each having a portion projecting into one of the said circumferentially extending grooves in the said carrier drum adjacent the said restricted throat or inlet to the said receptacle and adapted to eject completed straw members from the said straw-receiving slots or pockets in the said carrier drum into the said restricted throat or inlet to the said receptacle; and
(4) means for supporting the said straw-ejecting members with a portion of each of the same projecting into one of the said circumferentially extending grooves in the said carrier drum.

18. A machine as defined in claim 15 in which the said carrier drum includes:
(1) an internal hollow body; and in which the said heated die-forming means is arranged adjacent to the said carrier drum and having
    (a) a threaded die-forming surface disposed at the outer peripheral surface of the said carrier drum and in the path of travel of the said tubular plastic resinous drinking straw members carried thereby; and
(2) means including a flexible pressure belt member disposed adjacent the outer peripheral surface of the said carrier drum for pressing the said tubular plastic resinous drinking straw members against the said threaded die-forming surface during a phase of the rotational cycle of the said carrier drum.

19. A machine as defined in claim 15 which includes:
(1) a housing for the said threaded forming members mounted on the said supporting means co-axially with the said carrier drum at one end thereof and for rotation with the said carrier drum; and which includes
(2) an annular row of the said threaded forming members mounted in the said housing and co-equally spaced at intervals radially therearound with the said straw-receiving slots or pockets in the said carrier drum and projecting axially therefrom over the outer peripheral suface of the said carrier drum outwardly of and in registry with the straw-receiving slots or pockets;
(3) means for rotatably mounting the said threaded forming members in the said housing;
(4) individual gear means on each of the said threaded forming members;
(5) a driving member rotatably mounted co-axially with the carrier drum and the said housing for rotation independently of the said carrier drum and housing;
(6) master driving gear means carried by the said driving member and coacting with the said individual gear means on the said threaded forming members for rotating the said threaded forming members; and
(7) means for rotating the said driving member and the said master driving gear means carried thereby independently of the said carrier drum and housing but in unison therewith.

20. A machine as defined in claim 19 which includes:
(1) a plurality of slidable straw pushing and gripping devices carried by the said carrier drum and co-equally spaced with the straw-receiving slots or pockets in the said carrier drum at radial intervals therearound; and in which each of the said slidable straw-gripping and pushing devices includes:
    (a) a slidable member mounted on the carrier drum for rotation therewith radially outwardly of each of the said straw-receiving slots or pockets and extending axially thereof;
    (b) guide means carried by the said carrier drum for grinding each of the said slidable members;

(c) straw-pushing means carried by each of the said slidable members for pushing one of the said tubular plastic resinous straw members in the underlying one of the said straw-receiving slots or pockets in the carrier drum onto a corresponding one of the said threaded forming members;

(2) a tortuous irregularly-shaped cam trackway encircling the said carrier drum circumferentially and radially outwardly thereof; and (3) a cam member carried by each of the said slidable members and movable in the said tortuous irregularly-shaped cam trackway for moving the said slidable member and the said straw-pushing means carried thereby axially of the said carrier drum and toward a corresponding one of the said threaded forming members.

21. A machine as defined in claim 20 in which each of the said straw-pushing and gripping devices includes:

(1) a straw gripping member adapted to grip one of the said tubular plastic resinous straw members and to retract it from its supporting mandrel after the completion of the forming operation.

22. A machine as defined in claim 21 in which each of the said slidable members has (1) a cam member thereon; and in which the said machine includes (2) cam means mounted on the said supporting frame at the outer peripheral surface of the said carrier drum and coacting with each of the said cam members on the said slidable members for moving the said combination straw-pushing and gripping devices into engagement with the said tubular plastic resinous straw members.

23. A machine as defined in claim 22 in which the (1) said cam means coacts with the said cam members on the said slidable members and with the said combination straw-pushing and gripping devices to retract the said straw members from their threaded supporting members after the completion of the forming operation at a rate correlated to the speed of rotation of the said threaded supporting members.

References Cited

UNITED STATES PATENTS

| | | |
|---|---|---|
| 2,260,517 | 10/1941 | Hamilton. |
| 2,304,467 | 12/1942 | Maltby. |
| 2,476,658 | 7/1949 | Greiner. |
| 2,615,285 | 10/1952 | Gosnell et al. |
| 2,974,361 | 3/1961 | Gerdse et al. _____ 18—4 |
| 3,135,993 | 6/1964 | Ryan _____ 18—5 |

WILLIAM J. STEPHENSON, Primary Examiner

U.S. Cl. X.R.

18—5